(12) United States Patent
Hashmani et al.

(10) Patent No.: US 11,729,858 B2
(45) Date of Patent: Aug. 15, 2023

(54) UNIQUE IP ADDRESS IN AD-HOC BASE STATION

(71) Applicant: Parallel Wireless, Inc., Nashua, NH (US)

(72) Inventors: Azeem Hashmani, Newton, MA (US); Arun Seshadri, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 211 days.

(21) Appl. No.: 16/908,731

(22) Filed: Jun. 22, 2020

(65) Prior Publication Data
US 2020/0404742 A1 Dec. 24, 2020

Related U.S. Application Data

(60) Provisional application No. 62/864,568, filed on Jun. 21, 2019.

(51) Int. Cl.
*H04W 80/04* (2009.01)
*H04W 80/06* (2009.01)
*H04W 80/02* (2009.01)
*H04W 84/18* (2009.01)

(52) U.S. Cl.
CPC ........... *H04W 80/04* (2013.01); *H04W 80/02* (2013.01); *H04W 80/06* (2013.01); *H04W 84/18* (2013.01)

(58) Field of Classification Search
CPC ............. H04L 61/1511; H04L 61/2015; H04L 63/0272; H04W 76/11; H04W 80/02; H04W 80/04; H04W 80/06; H04W 84/18
See application file for complete search history.

(56) References Cited

U.S. PATENT DOCUMENTS

| | | | | |
|---|---|---|---|---|
| 8,588,793 | B2 * | 11/2013 | Tomici | H04W 40/04 455/445 |
| 2013/0083773 | A1 | 4/2013 | Watfa et al. | |
| 2018/0041934 | A1 | 2/2018 | Agarwal et al. | |
| 2018/0167796 | A1 * | 6/2018 | Raje | H04W 4/023 |
| 2018/0368100 | A1 * | 12/2018 | Kasirajan | H04W 68/02 |

FOREIGN PATENT DOCUMENTS

| | | | | |
|---|---|---|---|---|
| CA | 2812944 A1 * | 4/2012 | | H04L 61/2007 |
| CN | 103188351 A * | 7/2013 | | |
| WO | WO-2012012334 A2 * | 1/2012 | | H04L 29/0881 |
| WO | WO-2012167153 A1 * | 12/2012 | | H04W 60/00 |
| WO | WO-2018108261 A1 * | 6/2018 | | |

* cited by examiner

*Primary Examiner* — Saad A. Waqas
(74) *Attorney, Agent, or Firm* — Michael Y. Saji; David W. Rouille

(57) ABSTRACT

Systems, methods and computer software are disclosed for providing Internet Protocol (IP) address allocation in a wireless network. In one embodiment, the method includes sending, by a mesh node in the wireless network, an IP request to neighbor nodes; saving, by a gateway node (GW) in the wireless network, the request from the mesh node; proxying, by the GW, the mesh request to a HetNet Gateway (HNG) by providing a transient IP-Sec tunnel; replying, by the HNG, to the GW with a response; forwarding, by the GW, the response to the mesh node, the response including a dummy IP address; and starting, by the mesh node, a Self Optimizing Network (SON) tunnel with the GW using the dummy IP address.

20 Claims, 31 Drawing Sheets

UNIQUE IP ADDRESS IN AD-HOC BASE STATION

CROSS-REFERENCE TO RELATED APPLICATIONS

This application claims priority under 35 U.S.C. § 119(e) to U.S. Provisional Pat. App. No. 62/864,568, filed Jun. 21, 2019, titled "Unique IP Address Allocation in Ad-Hoc Base Station" which is hereby incorporated by reference in its entirety for all purposes. This application also hereby incorporates by reference, for all purposes, each of the following U.S. Patent Application Publications in their entirety: US20170013513A1; US20170026845A1; US20170055186A; 1US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416,•Heterogeneous Mesh Network and Multi-RAT Node Used Therein, filed May 8, 2013; U.S. Pat. No. 9,113,352, "Heterogeneous Self-Organizing Network for Access and Backhaul" filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, Parameter Optimization and Event Prediction Based on Cell Heuristics," filed Oct. 8, 2014, U.S. patent application Ser. No. 14/642,544, "Federated X2 Gateway", filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station/filed May 26, 2017; U.S. patent application Ser. No. 15/803,737, "Traffic Shaping and End-to-End Prioritization, filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Cellular base stations are often deployed on a telecommunications operator network with IP addresses; the IP address is a critical piece of the infrastructure that enables the operator network to communicate with the base station and, of course, with all user equipments (UEs) associated with that base station.

SUMMARY

Consequently, there is a need for a unique IP address allocation in a base station. The initialization process for enabling unique IP address allocation should also be considered. As well, base stations may additionally use gateway nodes, for proxying and/or virtualization. For a gateway node to proxy a request for any mesh node, the gateway node requires a dummy IP address (static or proprietary) to be assigned. If the gateway doesn't have the dummy IP address, all requests from a neighbor mesh node will be ignored. The word "mesh" here is used to mean any base station that has indirect backhaul, perhaps via another base station. Embodiments herein are understood to use both mesh and non-mesh backhaul.

Systems, methods and computer software are disclosed for providing Internet Protocol (IP) address allocation in a wireless network. In one example embodiment, a method includes saving, by a gateway node (GW) in the wireless network, the request from the mesh node; proxying, by the GW, the mesh request to a HetNet Gateway (HNG) by providing a transient IP-Sec tunnel; replying, by the HNG, to the GW with a response; forwarding, by the GW, the response to the mesh node, the response including a dummy IP address; and starting, by the mesh node, a Self Optimizing Network (SON) tunnel with the GW using the dummy IP address.

In another embodiment, a system for providing Internet Protocol (IP) address allocation in a wireless network includes a gateway (GW) node; a mesh node in communication with the GW; a HetNet Gateway (HNG) in communication with the GW; wherein the mesh node sends an IP request to neighbor nodes; the GW node saves the request from the mesh node; the GW proxies the mesh request to the HNG by providing a transient IP-Sec tunnel; the HNG replies to the GW with a response; the GW forwards, the response to the mesh node, the response including a dummy IP address; and the mesh node starts a Self Optimizing Network (SON) tunnel with the GW using the dummy IP address.

In another example embodiment, a non-transitory computer-readable medium contains instructions for providing Internet Protocol (IP) address allocation in a wireless network. The media includes instructions for sending, by a mesh node in the wireless network, an IP request to neighbor nodes; saving, by a gateway node (GW) in the wireless network, the request from the mesh node; proxying, by the GW, the mesh request to a HetNet Gateway (HNG) by providing a transient IP-Sec tunnel; replying, by the HNG, to the GW with a response; forwarding, by the GW, the response to the mesh node, the response including a dummy IP address; and starting, by the mesh node, a Self Optimizing Network (SON) tunnel with the GW using the dummy IP address.

DETAILED DESCRIPTION

Figure 1:
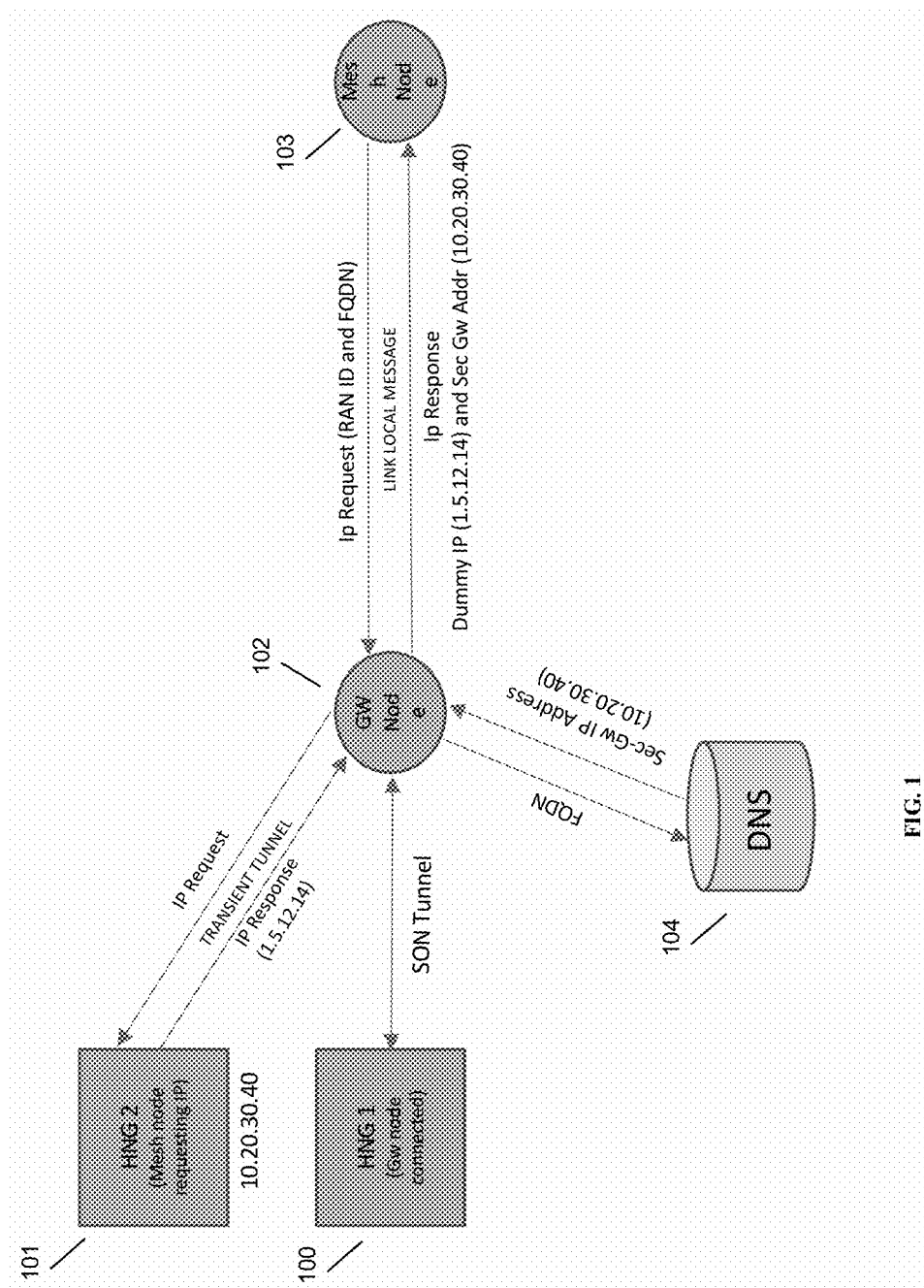
FIG. 1 is a system diagram for providing Internet Protocol (IP) address allocation in a wireless network wherein a neighbor node is a gateway, in accordance with some embodiments.

While one or more particular embodiments of a HetNet Gateway (HNG) may be described as part of the system of the present disclosure, it should be appreciated that the system may include no HNG; multiple HNGs; another network node located in a similar location in the network; a virtualized HNG or equivalent; a network node providing some but not all of the functions of the HNG; a network node providing virtualization of the RAN; a network node providing tunneling of signaling or traffic. The HNG can orchestrate and manage a Radio Access Network (RAN) across multiple technologies, including 3G, 4G, 5G and Wi-Fi. The HetNet Gateway is a carrier-grade, high-performance RAN orchestrator that is based on software-defined networking (SDN) and network functions virtualization (NFV), and is TOO percent compliant with all open and standard interfaces. The HNG virtualizes the RAN interfaces to manage the SG, 4G and 3G (Long Term Evolution, or LTE, and universal mobile telecommunications system, or UMTS) RANs (HomeNodeBs/NodeBs and eNodeBs/HeNodeBs) in real-time via multi-technology self-organizing network (SON) and gateway functionality while abstracting RAN changes from the core network and the core network itself from the RAN. The HNG virtualizes thousands of base stations to look like a smaller number of virtualized cells to the core. The HNG also virtualizes radio network nodes such as Wi-Fi access points (APs), eNodeBs and NodeBs and makes them self-configurable, self-adjustable, and self-healing, helping with initial installation and ongoing maintenance. The HNG acts like a virtual radio network controller (vRNC or virtual RNC) for multi-RAT network handling resources for different technologies 3G, LTE/4G, SG and WiFi while optimizing call processing towards radio and core network elements. Where the HNG is described herein, the inventors have conceived and contemplated the use of a network gateway that may provide one or more of the following features: a proxy for one or more protocols; virtualization functions for connected RANs; virtualization of connected core networks. The HNG is also capable of providing these functions for any RAT, as described below.

While one or more particular embodiments of a Converged Wireless System (CWS) are described as part of the system of the present disclosure, it should be appreciated that the CWS may be a base station supporting any G; any Wi-Fi AP; supporting X2 or another equivalent protocol; not supporting X2; mesh or no mesh; wireless backhaul or wired backhaul and supporting any combination of Gs. The CWS is a multi-RAT base station with 3G, LTE/4G, 5G and WiFi technologies that provides a flexible outdoor and in-vehicle solution in conjunction with the HNG. The combined system is a cloud-based network orchestration system that maximizes virtualization, and functions to bring 3G, LTE/4G, SG and WiFi operators better technology at lower cost. The combination of the HNG and the CWS addresses key challenges in delivering coverage, capacity, and quality of service (QoS), regardless of the cell size, e.g., femtocell, pico cell, micro cell, metro cell, or macro cell. In some embodiments, the CWS may be a multi-RAT base station with Wi-Fi and LTE access capability; integrated flexible backhaul including line of sight (LOS) and non-line of sight, fiber, Ethernet, and LTE backhaul; multi-radio multipoint-to-multipoint wireless mesh capability; control, security and traffic prioritization capability; self-organizing network (SON)-based interference mitigation for superior subscriber experience and dynamic RF power adjustments.

All the interfaces of both Gateway and Mesh nodes in network will join an IPV6 multicast group and run server to listen for messages in the same group. The mesh nodes don't have connectivity to the HNG so they will use this IPV6 multicast group to send an IPV6 link-local message to all its neighbor nodes.

Mesh Node Asking for IP Address

FIG. 1 shows a system including a first HNG 100 and a second HNG, 101 both in communication with a GW node 102. A mesh node 103 and a DNS 104 are also shown in communication with the GW node.

Figure 2:
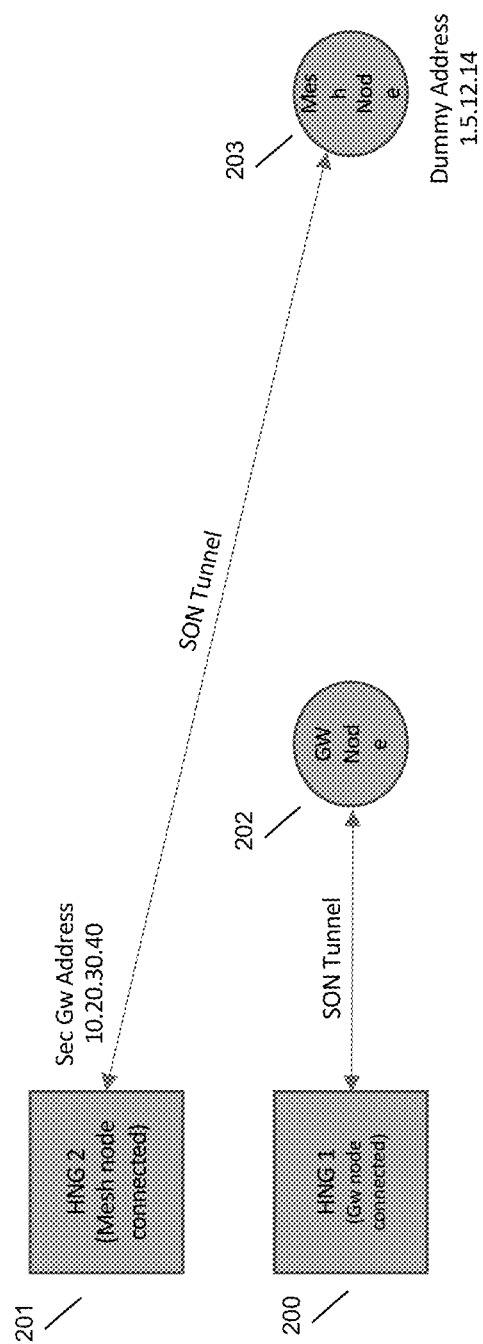
FIG. 2 is a system diagram for providing Internet Protocol (IP) address allocation in a wireless network wherein a neighbor node is a gateway, in accordance with some embodiments.

FIG. 2 shows a system including a first HNG 200 in communication with a GW node 202 by way of a SON tunnel. A second HNG 201 is shown in communication with a mesh node 203 also by way of a SON tunnel. Mesh node 203 has a dummy address of 1.5.12.14.

Scenario 1: Neighbor Node is Gateway

For a gateway node to proxy a request for any mesh node it should have a static or Proprietary assigned Dummy IP address. If GW node doesn't have a dummy IP address all the request from its neighbor mesh node will be ignored.

When mesh node comes up it will send an IP request via Link-local multicast group to its neighbors. The IP address request will be a broadcast message on all the interfaces of mesh node, and it will consist of its RAN ID and FQDN of connecting HNG.

The neighbor Gateway will save the received request from mesh node in a map (Interface ID to RANID Map). DNS resolution will be done on FQDN received from the mesh node so that the gateway node knows the address of HNG to start an Ip-Sec Tunnel.

Gateway node will then proxy the mesh request to the desired HNG by creating an Transient IP-Sec Tunnel between its WAN address and HNG address (DNS of FQDN).

Once HNG has its response ready (IP-address or Error Code) it will reply to Gateway node using the same IP-Sec Tunnel. After gateway node receives the response for mesh node it will tear down the IP-Sec Tunnel it created. The notion of "transient tunnel" as used herein refers to the fact that the tunnel is no longer needed once the response is received at the receiving node, here, the gateway node. Tunnels may be maintained but the inventors have understood that it may be useful to tear them down for reduction of overhead and for simplicity.

The received response at Gateway node will now look for map (Interface ID to RANID Map) to find out which interface to use to forward the response. It will also add DNS resolution of FQDN called as Sec Gw Address in its response and forward this response using link-local address to the multicast group only at that interface. Since we send response on one interface this would be a unicast message. The map value for that interface will be cleared since we have honored the request for that RANID on an interface.

When mesh node receives the response from gateway node with a Dummy IP address and Sec Gw address. It will apply the IP address and start a SON tunnel between its dummy address and Sec Gw Address. Bulk config will be an acknowledgement to the HNG that the IP address that it gave to Mesh node is used. In case the response is with an error code the Mesh node will keep sending out IP address request to its neighbors.

This method is flexible enough to provide an IP address while keeping tunneling secure. As well, this method is able to handle IPv4 as well as IPv6. As well, this method is applicable to any RAT or other network deployment, as long as it uses well-established tunneling protocols such as IPsec.

Figure 3:
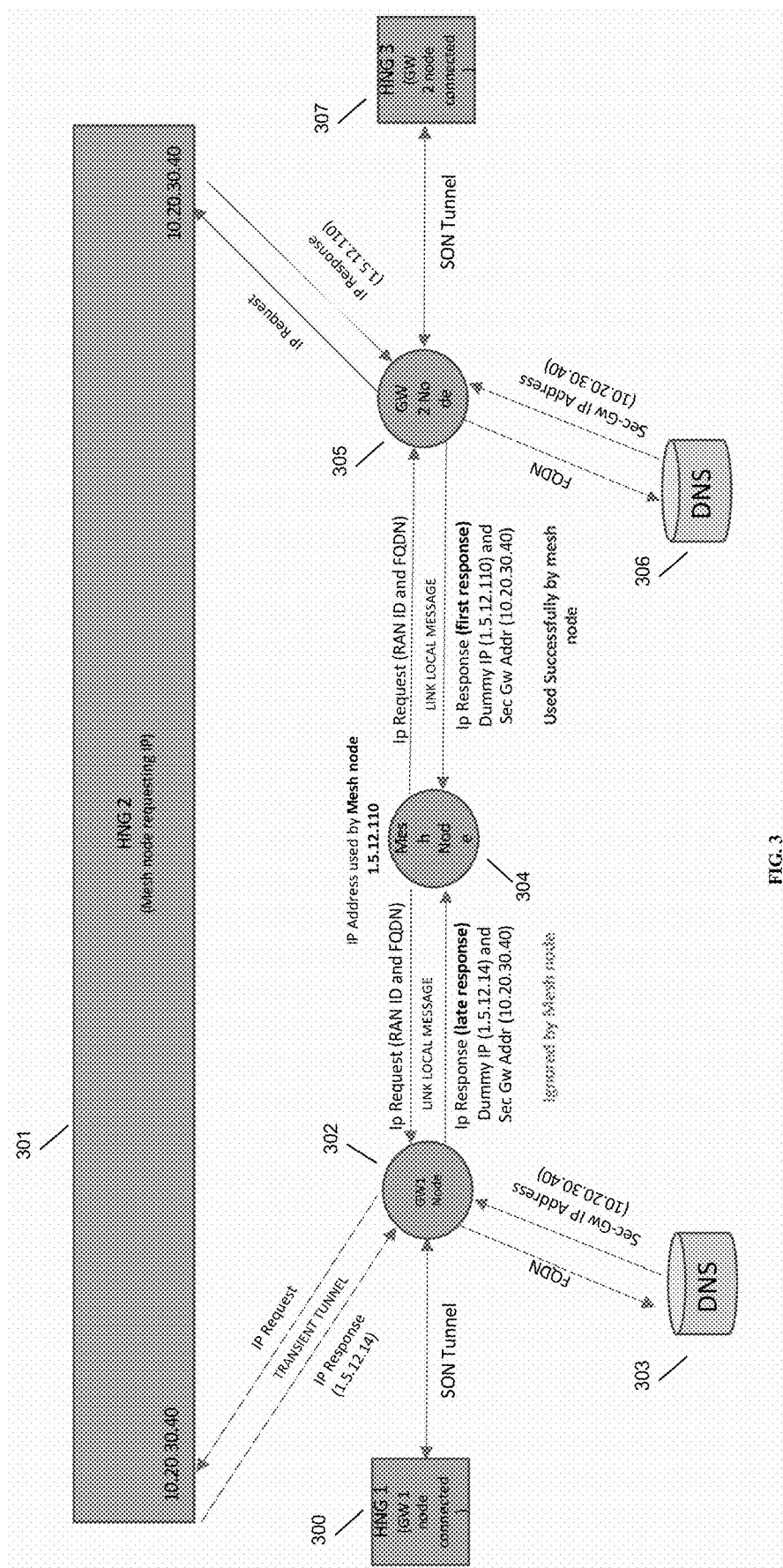
FIG. 3 is a system diagram for providing Internet Protocol (IP) address allocation in a wireless network wherein both neighbor nodes are gateways, in accordance with some embodiments.

FIG. 3 shows a system including a first HNG 300 and a second HNG, 301 both in communication with a first GW node 302. A DNS 303 is in communication with the GW node 302. A mesh node 304 is shown in communication with the first GW node 302 and with a second GW node 305. A DNS 305 and a third HNG 307 are in communication with GW 305. HNG 301 is also in communication with GW 305.

Figure 4:
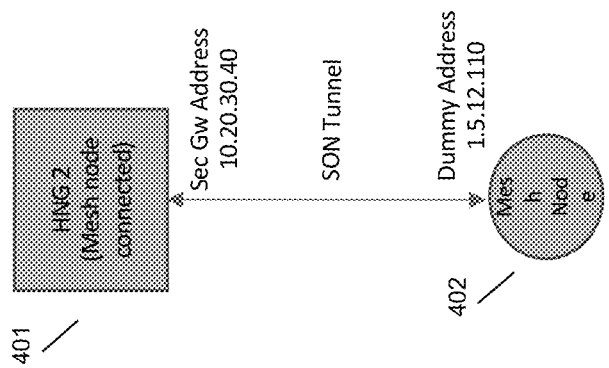
FIG. 4 is a system diagram for providing Internet Protocol (IP) address allocation in a wireless network wherein both neighbor nodes are gateways, in accordance with some embodiments.

FIG. 4 shows a system including a second HNG 400 in communication with a mesh node 401 by way of a SON tunnel.

In FIG. 3 and FIG. 4, both neighbors are Gateways. In case the mesh node has two GW neighbors it will request the IP address to both neighbor's and then will use the address which it got first. All other responses will be ignored.

For a mesh node to forward a request to its other neighbors it should have a static or Proprietary assigned Dummy Ip address. If the neighbor mesh node doesn't have an IP address all the request from its neighbor mesh node will be ignored.

When a mesh node comes up it will send an Ip request to via Link-local multicast group to all its neighbors. The IP address request will consist of its RAN ID and FQDN of connecting HNG.

The mesh neighbors who have already have a dummy Ip address will forward the request to all their neighbors and save the interface ID in in a map (Interface ID to RANID Map). Eventually this request after been forwarded by all the mesh nodes will travel down to the Gateway node. All the mesh node that have handled this request will update their map (Interface Id to RANID) to know that the mesh node requested for IP address from which interface The neighbor Gateway will also save the received request from mesh node in a map (Interface ID to RANID Map). DNS resolution will be done on FQDN received from the mesh node so that the gateway node knows the address of HNG to start an Ip-Sec Tunnel.

Gateway node will then proxy the mesh request to the desired HNG by creating a Transient IP-Sec Tunnel between its WAN address and HNG address (DNS of FQDN).

Once HNG has its response ready (IP-address or Error Code) it will reply to Gateway node using the same IP-Sec Tunnel. After gateway node receives the response for mesh node it will tear down the IP-Sec Tunnel it created.

The received response at Gateway node will now look for map (Interface ID to RANID Map) to find out which interface to use to forward the response. It will also add DNS resolution of FQDN called as Sec Gw Address in its response and forward this response using link-local address to the multicast group only at that interface. Since we send response on one interface this would be a unicast message. The map value for that interface will be cleared since we have honored the request for that RANID on an interface. This message will travel down the same path it came from with each mesh node know in their map where to forward the packet.

When mesh node receives the response from its neighbor mesh node with a Dummy IP address and Sec Gw address. It will apply the IP address and start a SON tunnel between its dummy address and Sec Gw Address. Bulk config will be an acknowledgement to the HNG that the IP address that it gave to Mesh node is used. In case the response is with an error code the Mesh node will keep sending out IP address request to its neighbors.

Figure 5:
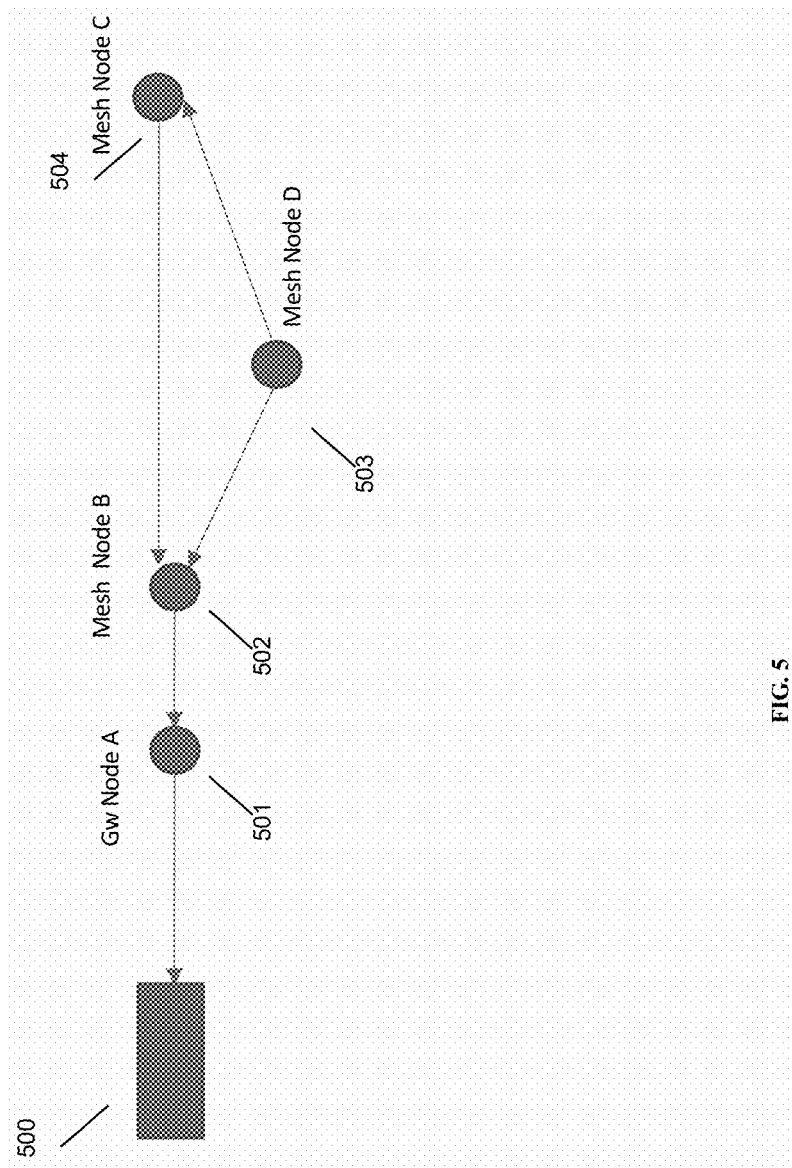
FIG. 5 is a system diagram for providing Internet Protocol (IP) address allocation in a wireless network wherein node receive multiple requests, in accordance with some embodiments.

FIG. 5 shows an network having an HNG 500 in communication with a GW node 601. Mesh node B 602 is in communication with GW node, mesh node C 603 and mesh node D 604. This scenario involves nodes receiving multiple request-Sequence number. Gateway Node A, Mesh Node B and C have Ip addresses assigned to them. When Mesh Node D is requesting for IP address it will add a sequence number to its request. Two request direct connection and undirect connection (via Mesh Node C) will go to Mesh Node Bf or Mesh Node D. Most likely Mesh Node D direct request will reach Mesh Node B so it will save the interface and its sequence number. All other request for Mesh Node D will not be processed unless the sequence number is greater than the currently requested. In this way Gw Node A will receive only one request for Mesh Node D and flooding of request packets will be avoided. As soon as HNG responds successfully to a request of a node with an IP address it sets the offered timer for that IP address. After the offered time expires HNG will re-use the IP address in its Ip-pool.

If mesh node was successful to apply the IP address and send a bulk config request to HNG after the offered time the HNG will ask Mesh node to reboot and again ask for IP address.

Nodes receiving error response instead of IP address.

Following are the error messages that can come as a response from HNG to a node requesting for IP address 1. HNG NO POOLS CONFIGURED: No pools are configured on HNG 2. INVALID SEC GW ADDRESS: The gateway node wasn't successful to do a DNS resolution of FQDN used on mesh node 3. HNG RESOURCE FAILURE: HNG doesn't have enough resource to assign IP address.

Figure 6:
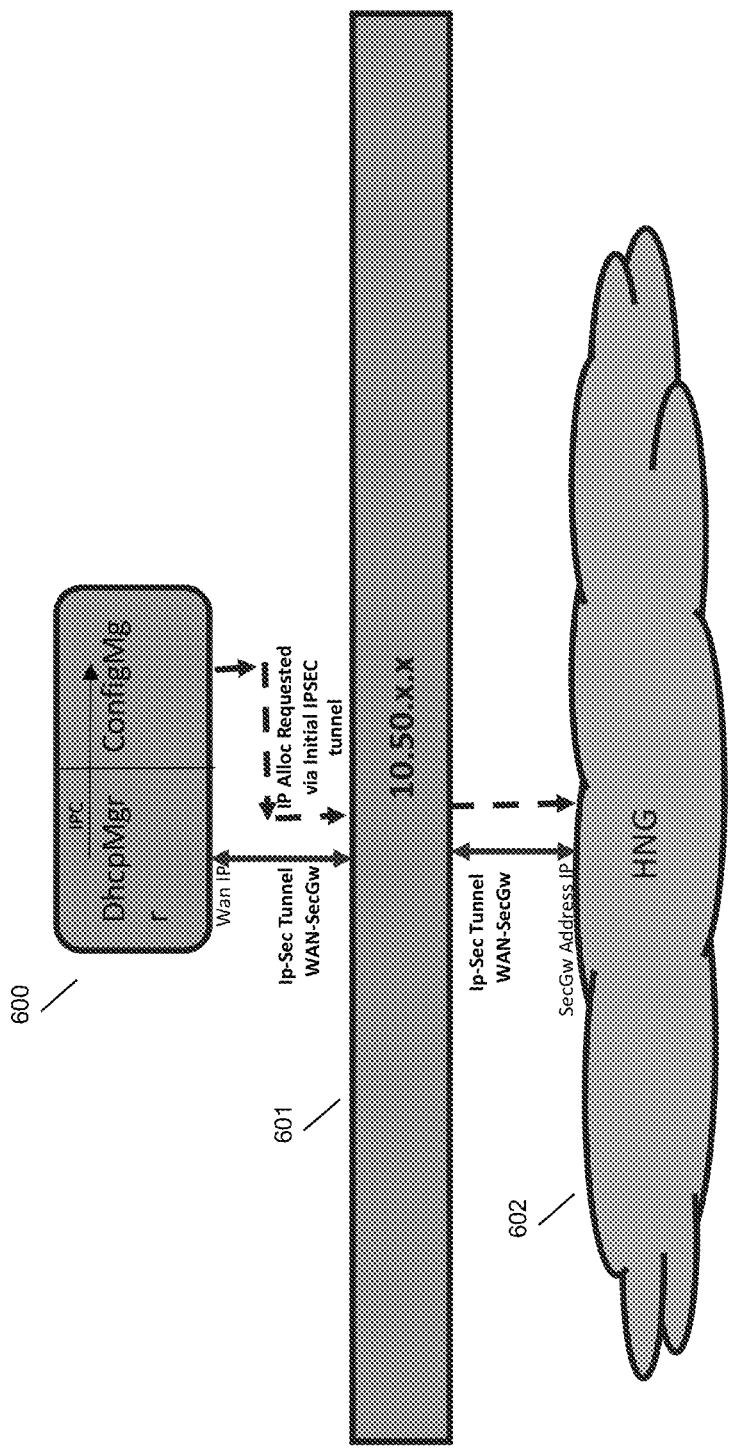
FIG. 6 is a system diagram for providing Internet Protocol (IP) address allocation in a wireless network wherein a gateway node requests for an IP address from an HNG, in accordance with some embodiments.

Under all these scenario's the mesh node will keep requesting for IP address from its neighbor FIG. 6 shows a system having a mesh node 600 in communication with a GW node 601 which is in communication with HNG 602. Gateway Node Requesting for IP address from HNG for itself. When Gateway node request for IP address it will request WAN IPSEC Tunnel to the HNG. DhcpMgrwill detects the node role as 'Gateway' and sends an IPC to Configmgr to request Ip address using Proprietary method for itself. Configmgr receives the IPC and sends the request to HNG for IP allocation for itself using WAN IPSEC Tunnel.

Figure 7:
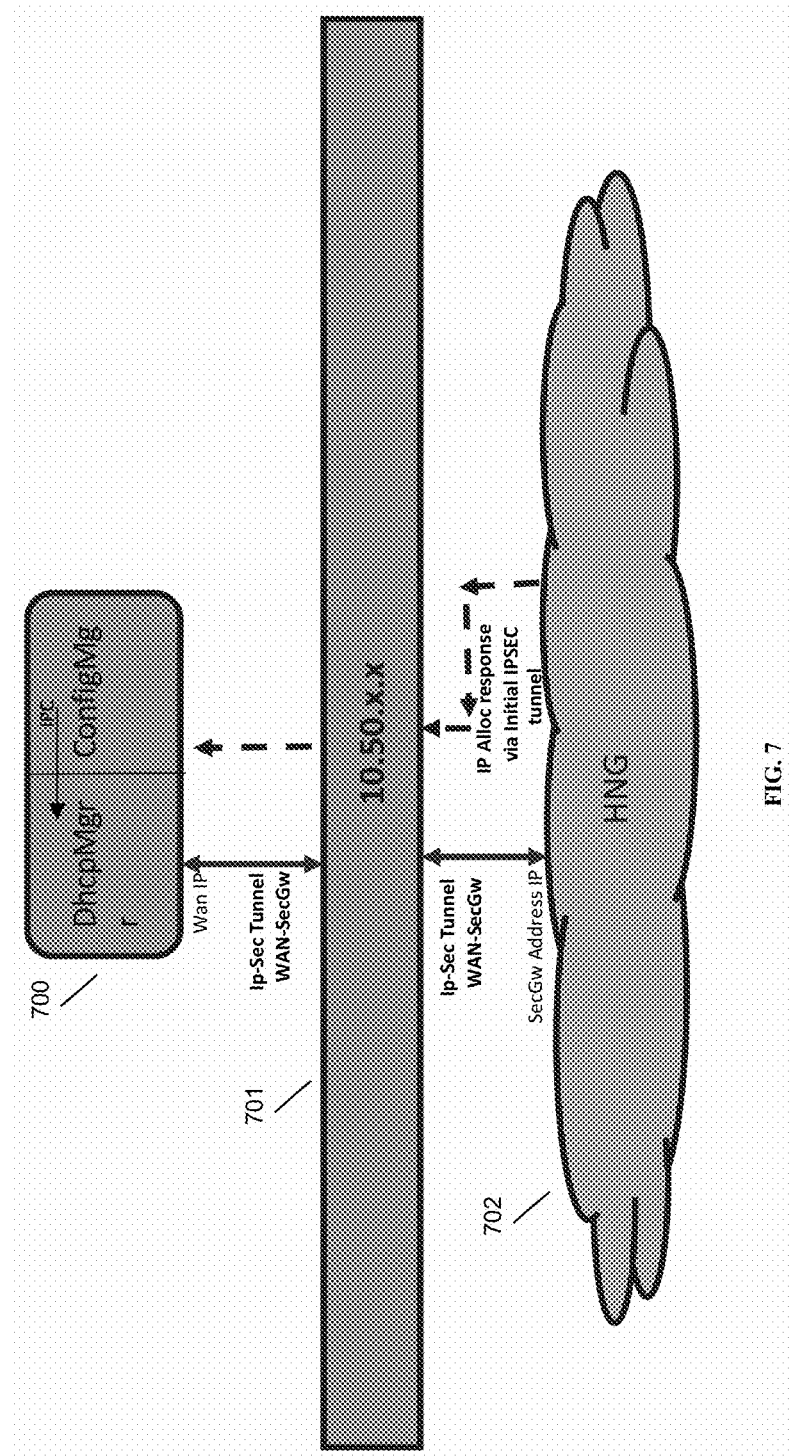
FIG. 7 is a system diagram for providing Internet Protocol (IP) address allocation in a wireless network wherein an HNG responds with an IP address or error message, in accordance with some embodiments.

FIG. 7 shows a system having a mesh node 700 in communication with a GW node 701 which is in communication with HNG 702. HNG responding with IP address/Error to Gateway Node.

HNG will send a response with IP address or Error for not Assigning IP using the same socket on WAN Ipsec Tunnel that was created by CWS.

Configmgr on HNG will receive the IP address and check if the assigned IP address is for itself and send IPC to dhcpmgr indicating IP address is for itself DhcpMgr receives the IPC with IP address, checks if the address is not received from some other path and applies the IP address on its interface.

Figure 8:
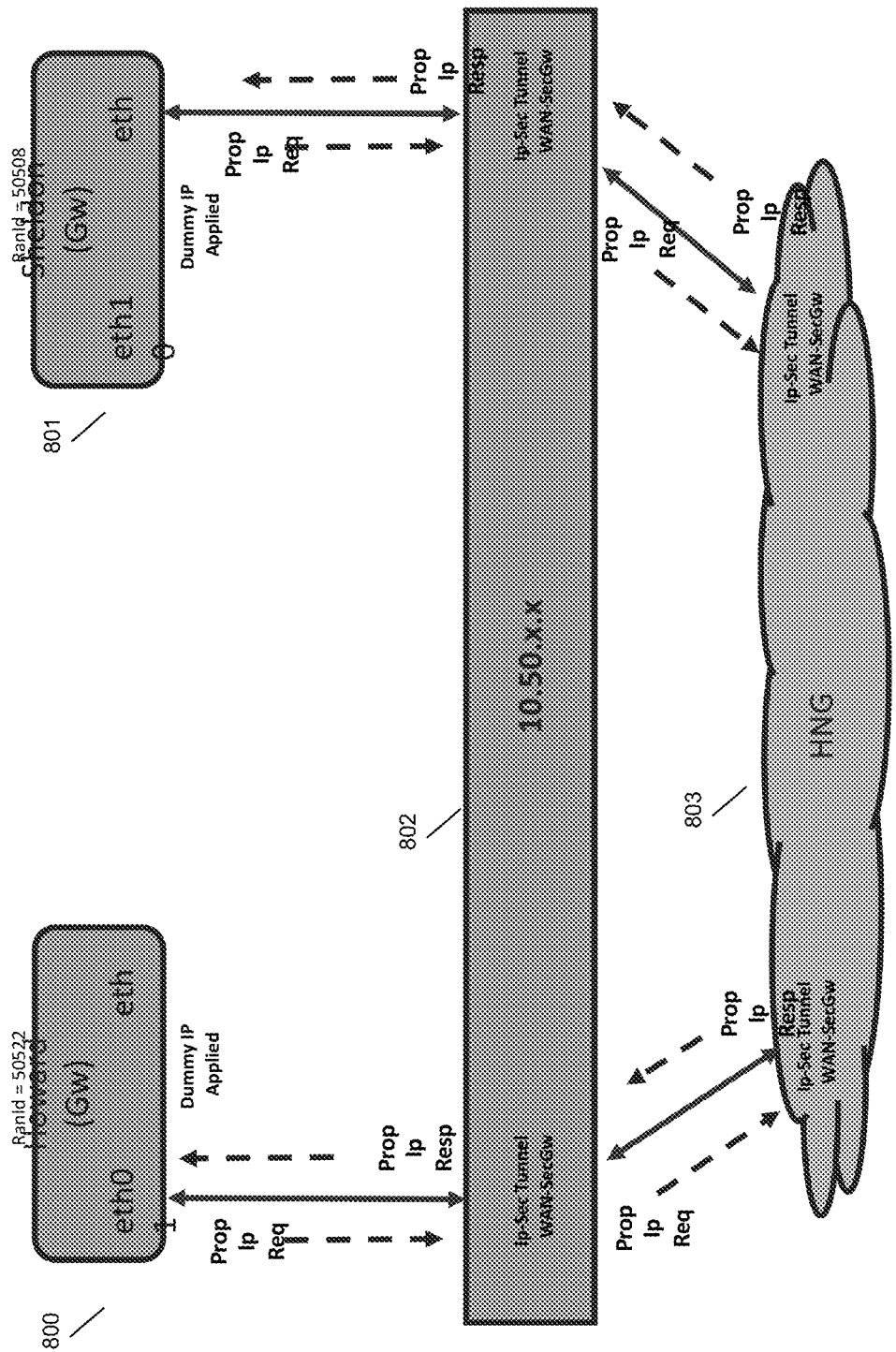
FIG. 8 is a system diagram showing dynamic IP allocation, in accordance with some embodiments.

FIG. 8 shows a first mesh node 800 and a second mesh node 801 both in communication with GW 802 which is in communication with HNG 803. GW node and HNG Dynamic IP allocation request and response.

Figure 9:
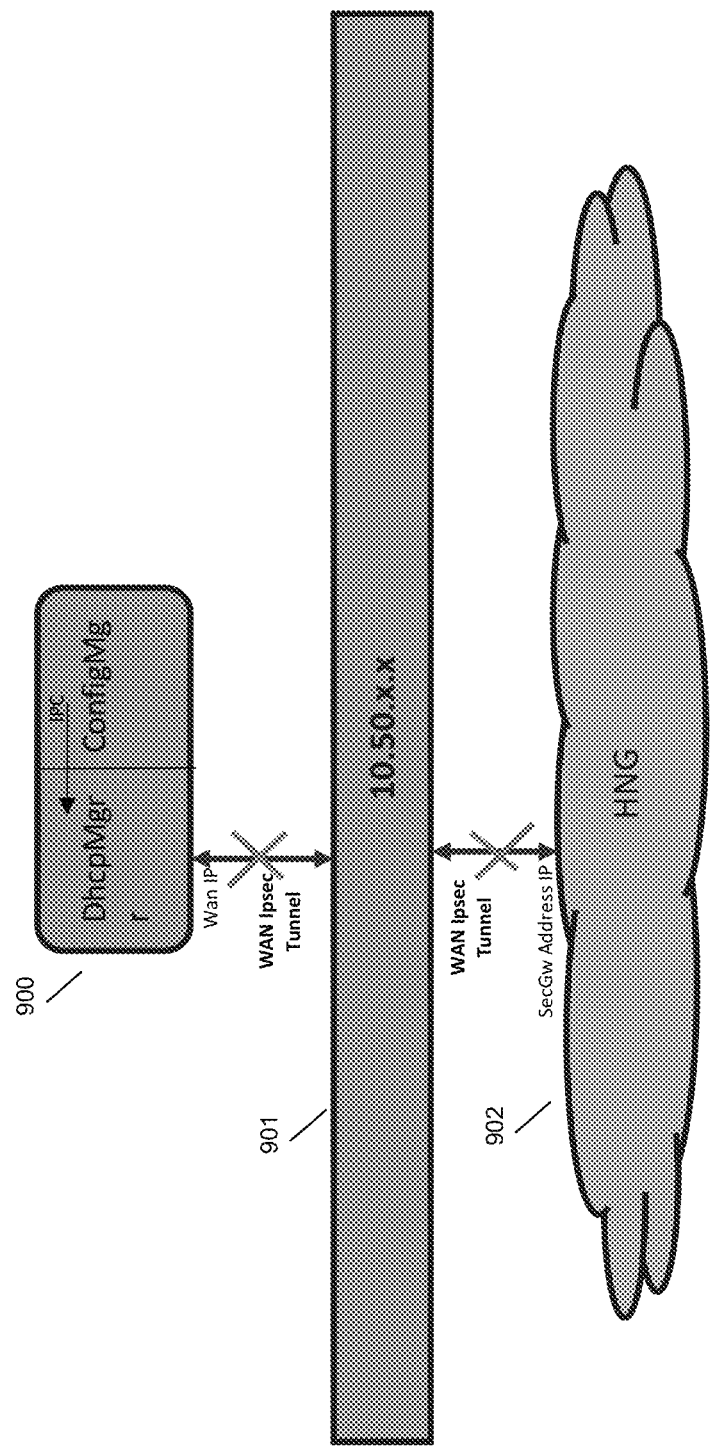
FIG. 9 is a system diagram for providing Internet Protocol (IP) address allocation in a wireless network wherein a dummy IP address has been received, in accordance with some embodiments.

FIG. 9 shows a mesh node 900 in communication with a GW node 901 which is in communication with HNG 902 and depicts steps taken after receiving IP address (Dummy Address) from HNG. After receiving dummy IP address Gw node will tear down its WAN Tunnel. To run all the applications on GW node and request IP address for Mesh nodes the GW node will start SON IPSEC Tunnel.

Figure 10:
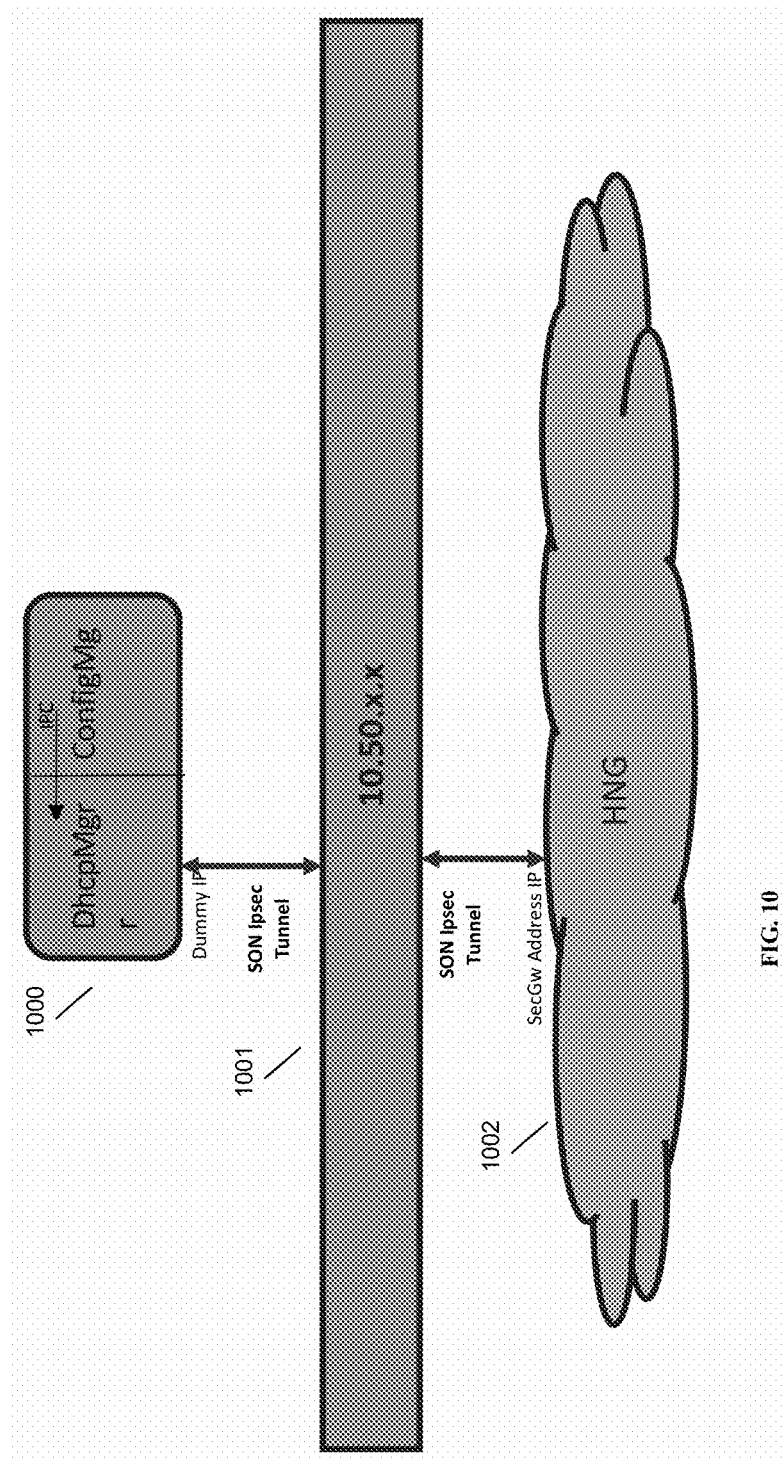
FIG. 10 is a system diagram for providing Internet Protocol (IP) address allocation in a wireless network wherein a dummy IP address has been received, in accordance with some embodiments.

FIG. 10 shows a mesh node 1000 in communication with a GW node 1001 which is in communication with HNG 1002 and depicts steps taken after receiving IP address (Dummy Address) from HNG. After receiving dummy IP address GW node will tear down its WAN Tunnel. To run all the applications on GW node and request IP address for Mesh nodes the GW node will start SON IPSEC Tunnel.

Figure 11:
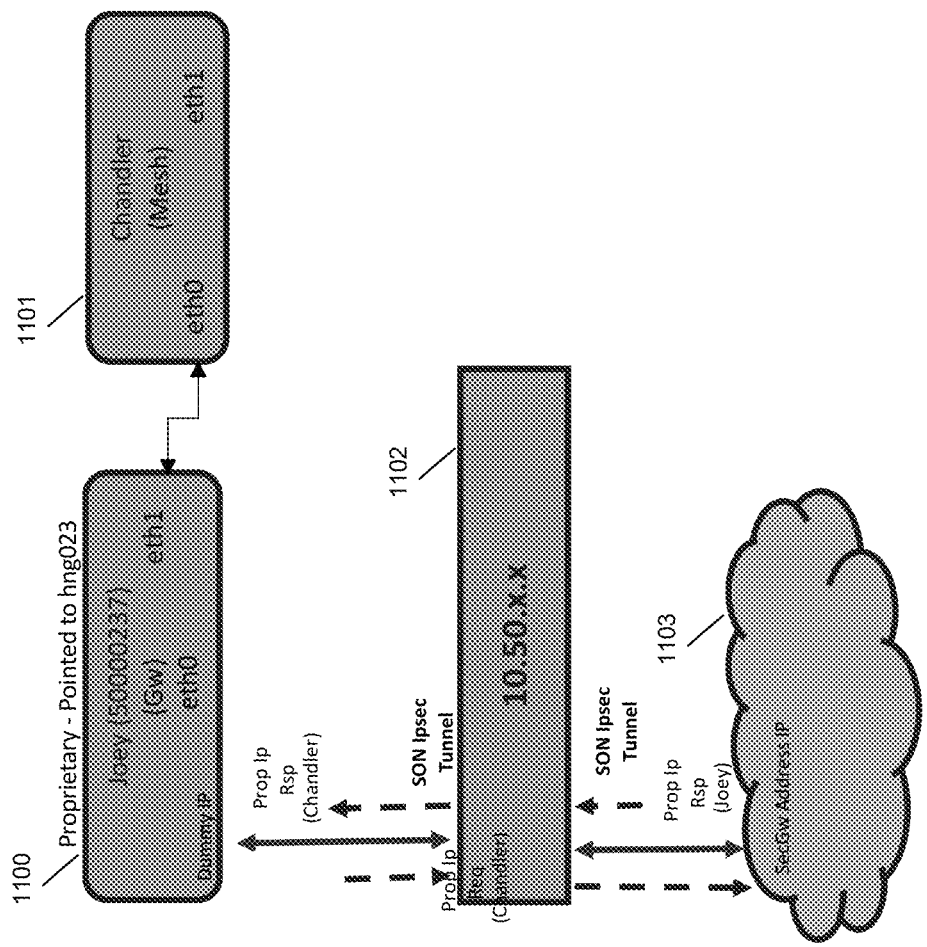
FIG. 11 is a system diagram for providing Internet Protocol (IP) address allocation in a wireless network wherein a mesh node requests an IP address from an HNG, in accordance with some embodiments.

FIG. 11 shows a mesh node 1100 and a mesh node 1101, both in communication with a GW node 1102 which is in communication with HNG 1103 and depicts steps taken with a mesh node requesting for IP address from HNG for itself via Gateway Node. The mesh node will request for IP address via the link local message between itself and the Gateway node. This request message will contain the RanId of Mesh (Requesting) node. When Gateway node request for IP address on behalf of a Mesh node it will use SON IPSEC Tunnel. The request message will have the RanId of requesting node to identify themselves.

Figure 12:
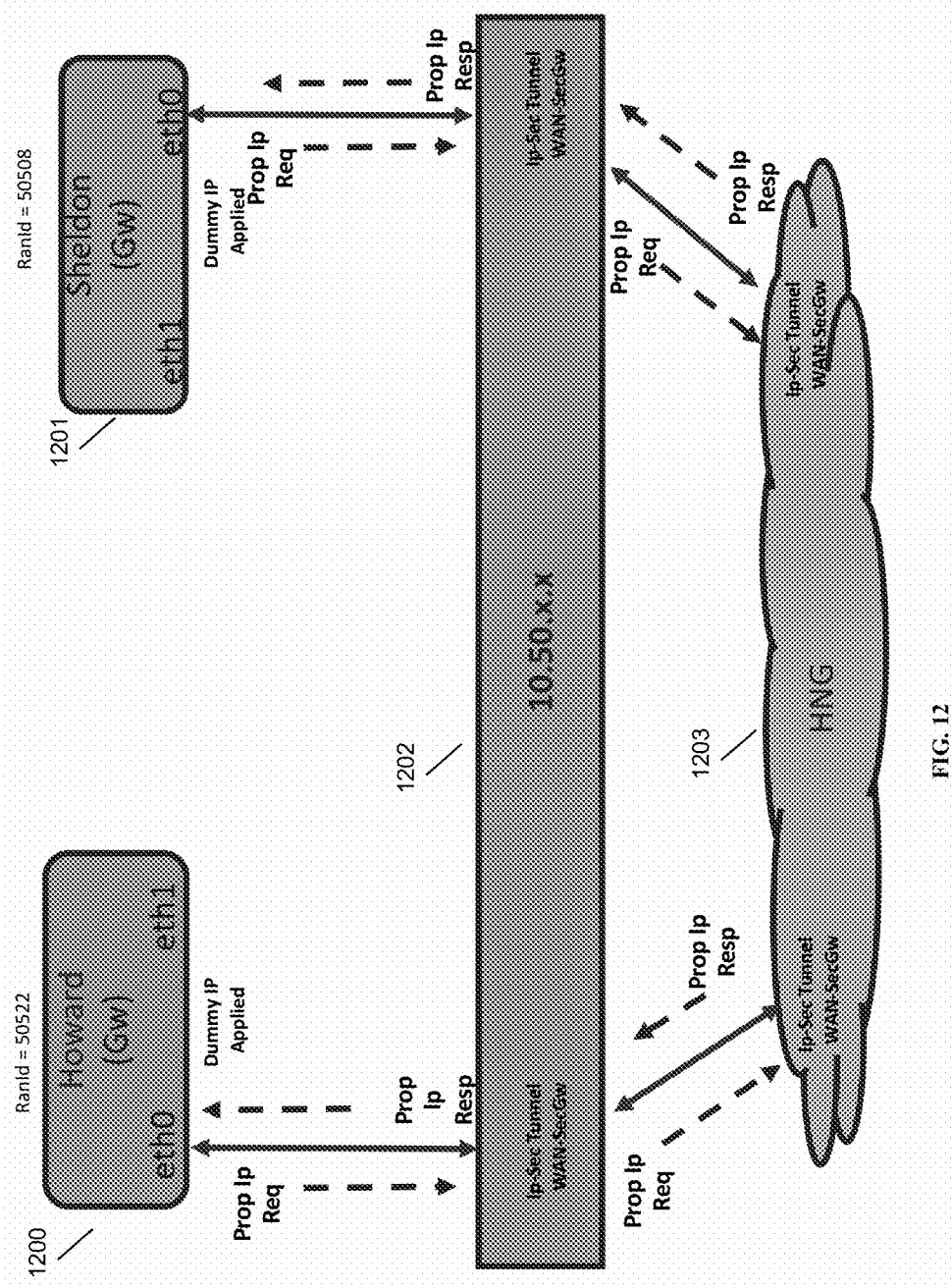
FIG. 12 is a system diagram for providing Internet Protocol (IP) address allocation in a wireless network showing GW to HNG communications, in accordance with some embodiments.

FIG. 12 shows a mesh node 1200 and a mesh node 1201, both in communication with a GW node 1202 which is in communication with HNG 1203.

Figure 13:
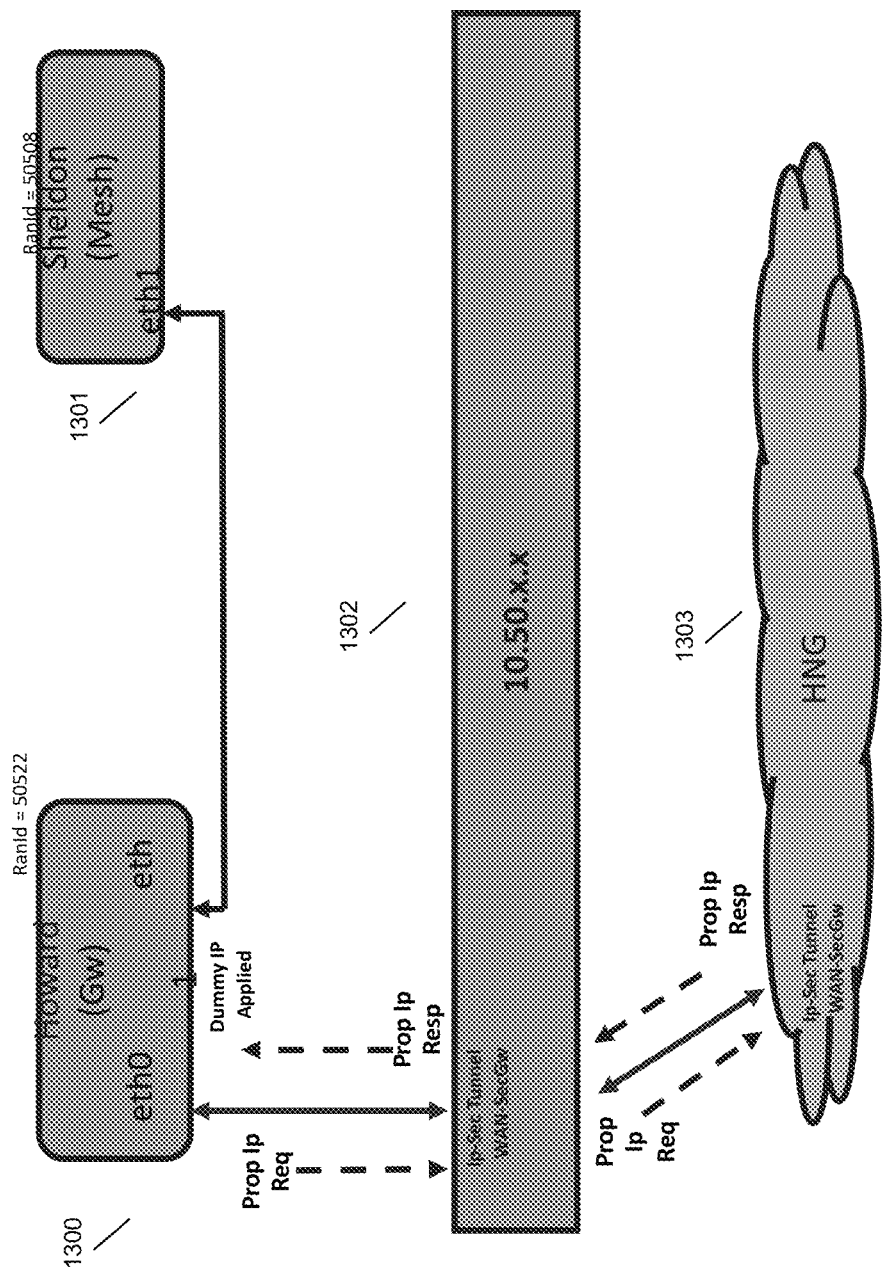
FIG. 13 is a system diagram for providing Internet Protocol (IP) address allocation in a wireless network showing GW-mesh to HNG communications, in accordance with some embodiments.

FIG. 13 shows a mesh node 1300 and a mesh node 1301, both in communication with a GW node 1302 which is in communication with HNG 1303.

Figure 14:
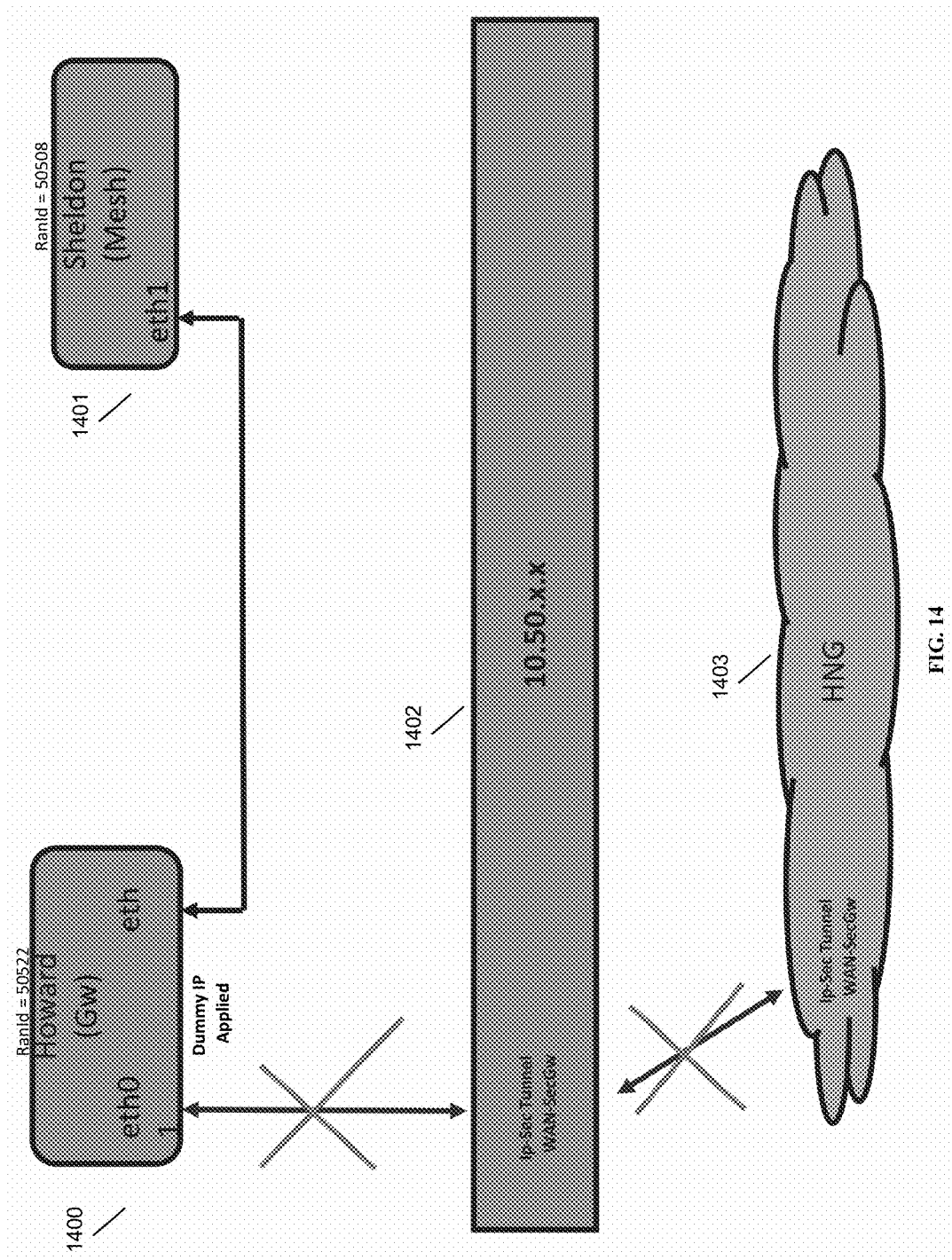
FIG. 14 is a system diagram for providing Internet Protocol (IP) address allocation in a wireless network showing GW-mesh to HNG communications, in accordance with some embodiments.

FIG. 14 shows a mesh node 1400 and a mesh node 1401, both in communication with a GW node 1402 which is in communication with HNG 1403.

FIGS. 12-14 depict the steps regarding GW-mesh to HNG communications.

Figure 15:
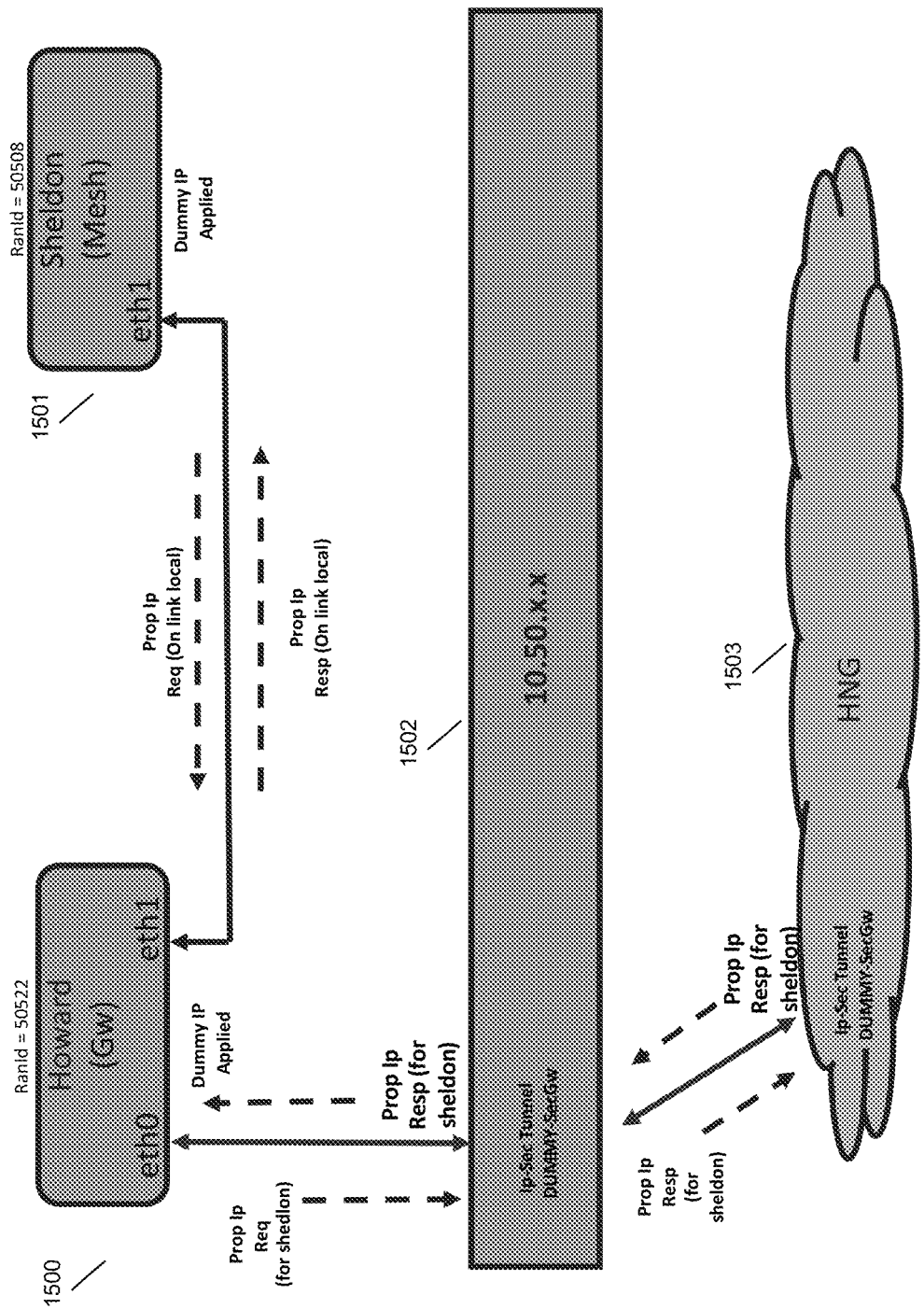
FIG. 15 is a system diagram for providing Internet Protocol (IP) address allocation in a wireless network showing GW-mesh to HNG communications, in accordance with some embodiments.

FIG. 15 shows a mesh node 1500 and a mesh node 1501, both in communication with a GW node 1502 which is in communication with HNG 1503 and depicting the steps regarding GW-mesh to HNG communications.

Figure 16:
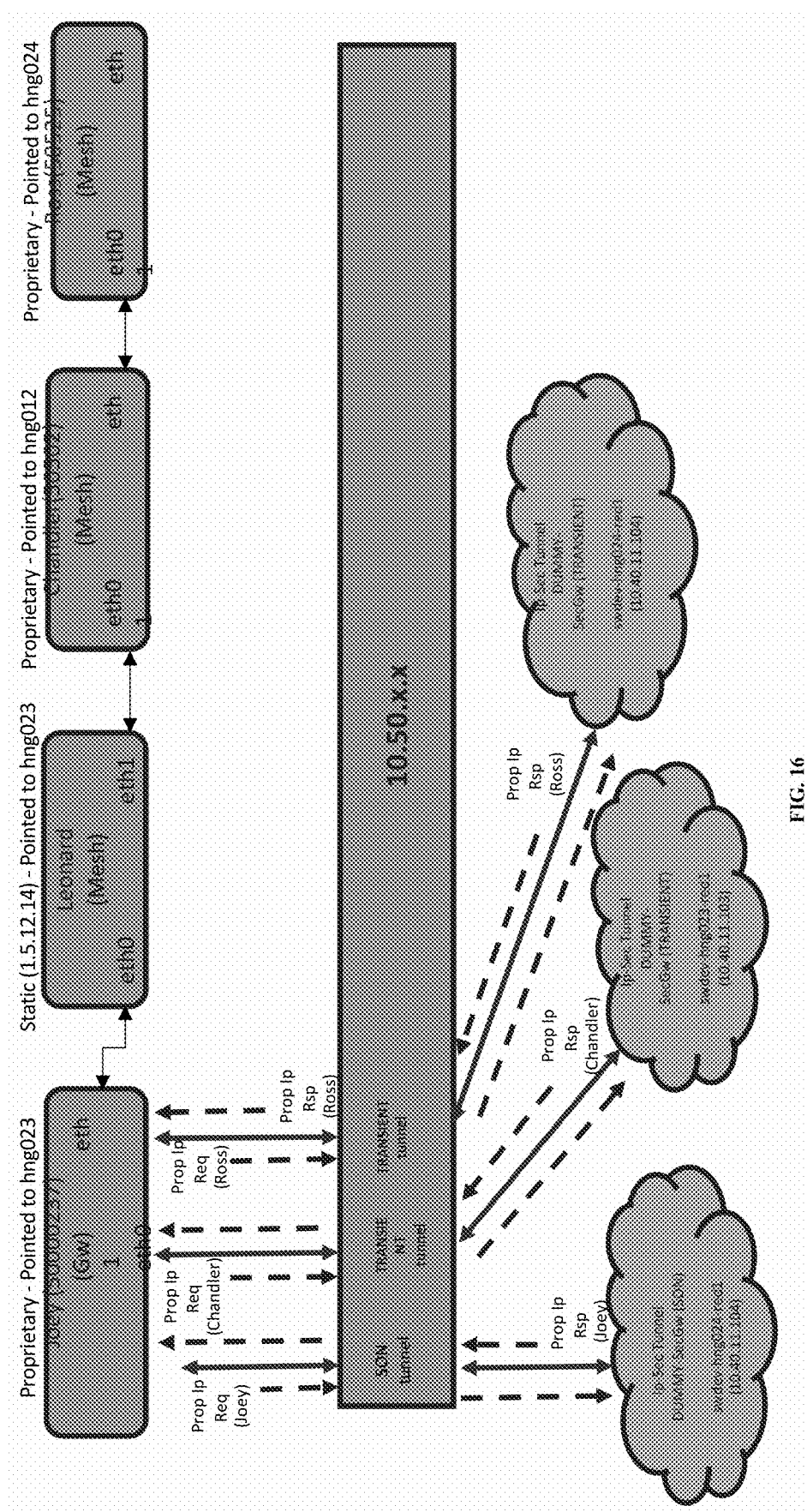
FIG. 16 is a system diagram for providing Internet Protocol (IP) address allocation in a wireless network showing GW-multi-mesh to HNG communications, in accordance with some embodiments.

FIG. 16 shows a mesh node 1600 in communication with a GW node 1604. Also shown are mesh node 1601 in communication with mesh node 1600, mesh node 1602 in communication with mesh node 16001 and mesh node 1603 in communication with mesh node 1602. Mesh node 1600 is in communication with GW 1604. GW 1604 is in communication with each of HNG 1605, HNG 1606 and HNG 1607. This figure depicts the steps regarding GW-multi-mesh to HNG communications.

Figure 17:
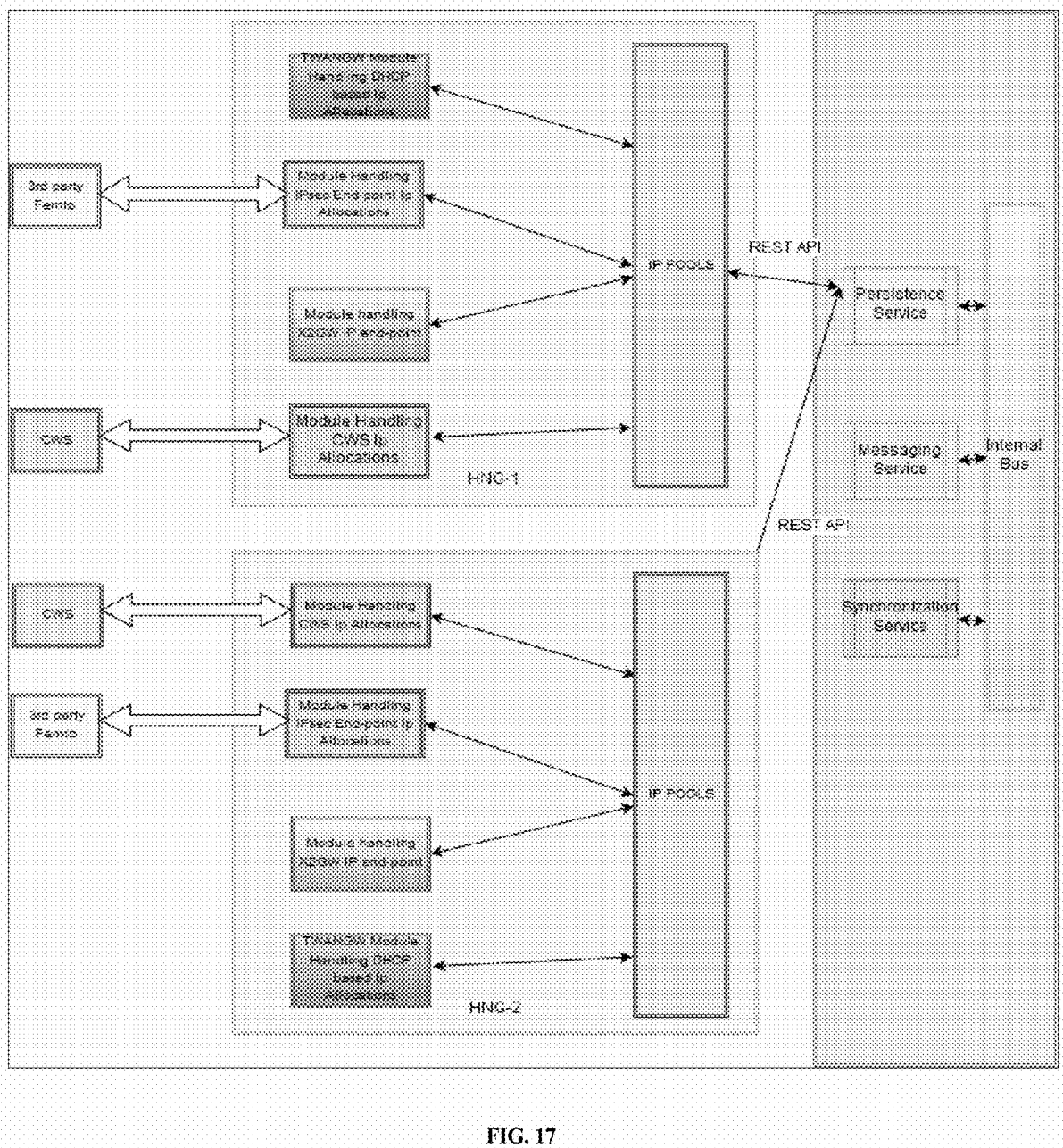
FIG. 17 is a system diagram for providing Internet Protocol (IP) address allocation in a wireless network showing a relay mechanism at the HNG, in accordance with some embodiments.

FIG. 17 is a system diagram showing CWS IP Address Allocation-CI using Stash/GIT-Confluence.

Figure 18:
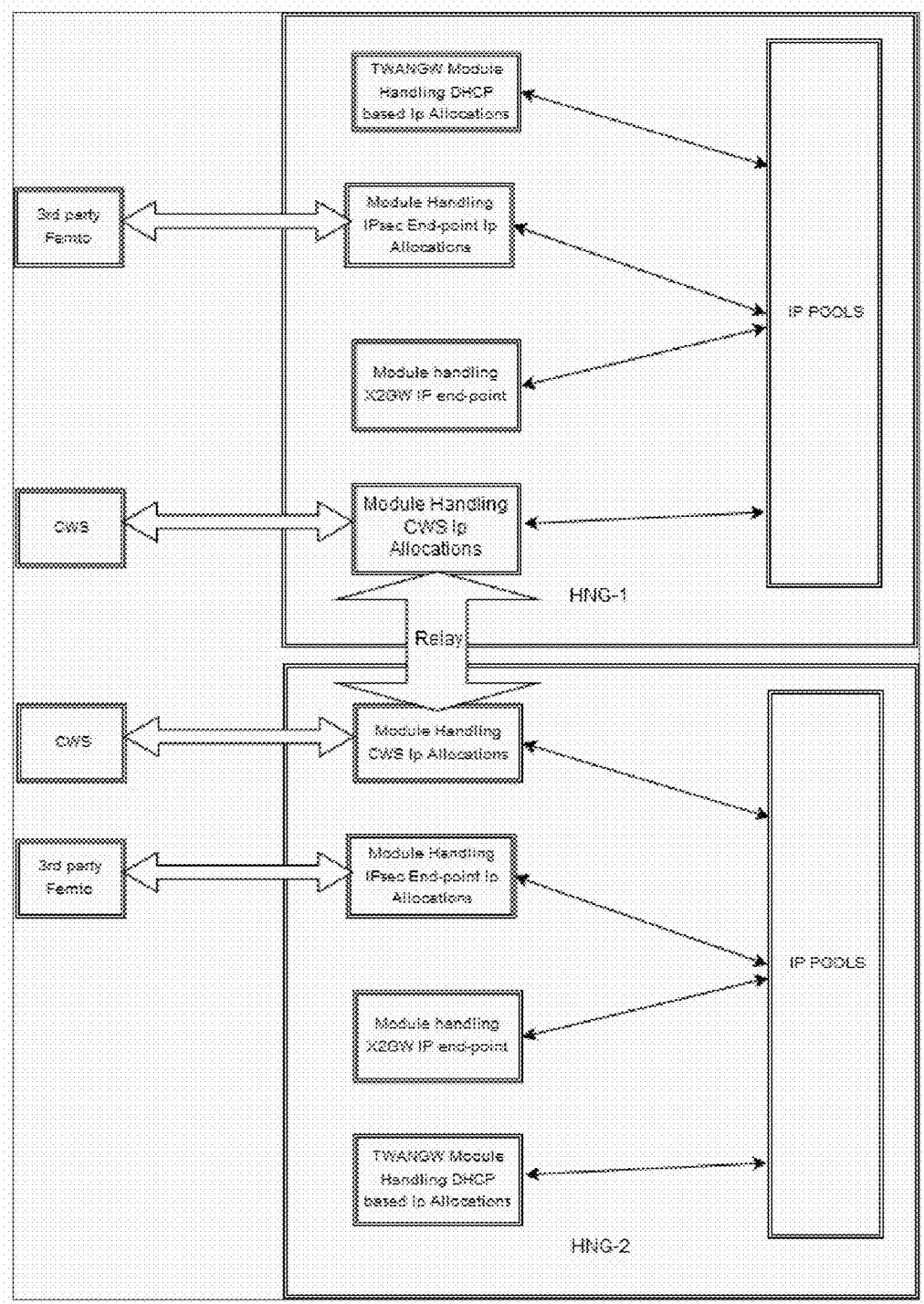
FIG. 18 is a system diagram for providing Internet Protocol (IP) address allocation in a wireless network showing a relay using a service bus messaging service, in accordance with some embodiments.

FIG. 18 is a system diagram showing relay mechanism at HNG using a service bus messaging service.

Figure 19:
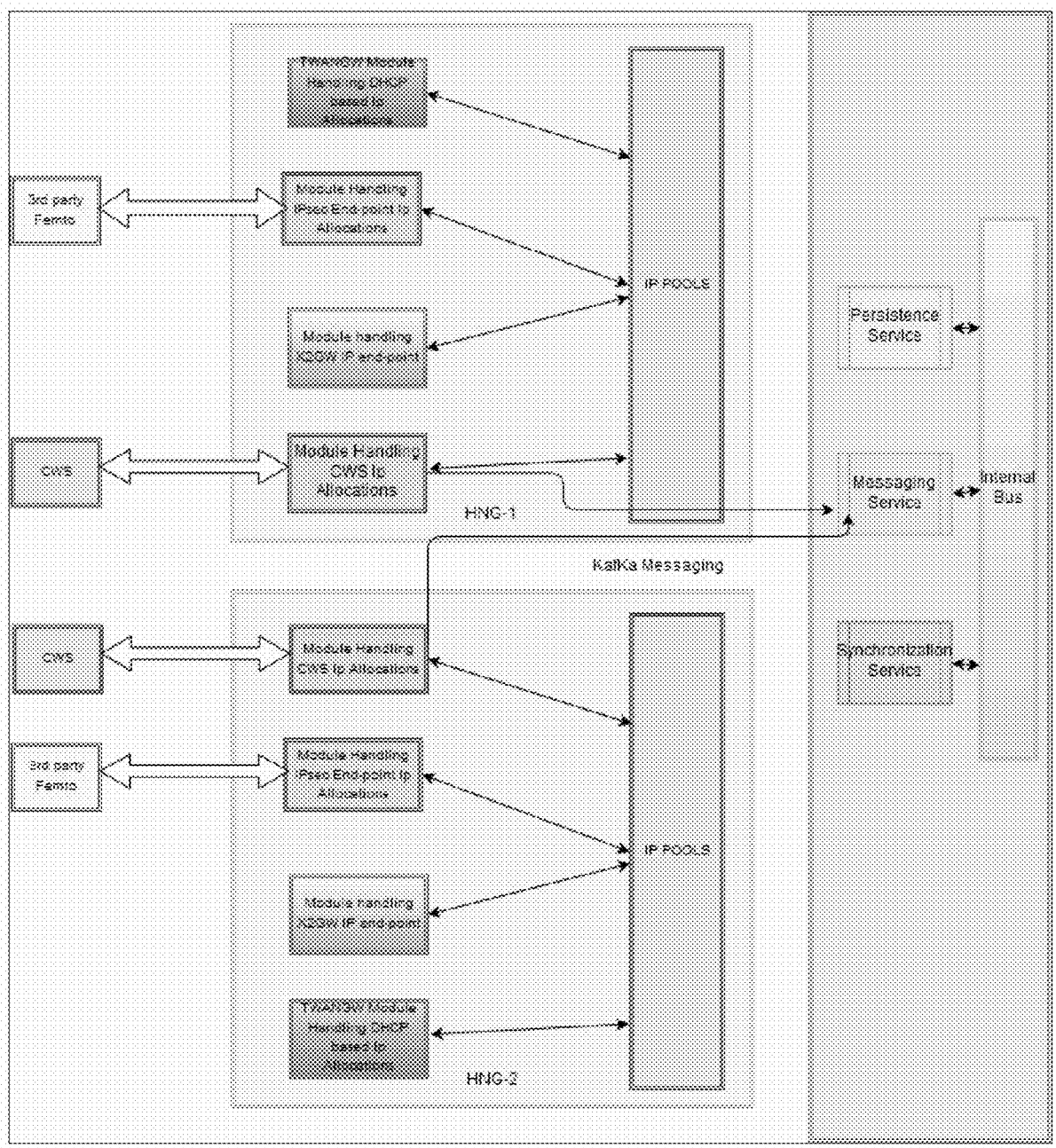
FIG. 19 is a system diagram for providing Internet Protocol (IP) address allocation in a wireless network showing a relay using generic TCP/IP messaging, in accordance with some embodiments.

FIG. 19 is a system diagram showing relay mechanism at HNG using a generic TCP/IP messaging.

Figure 20:
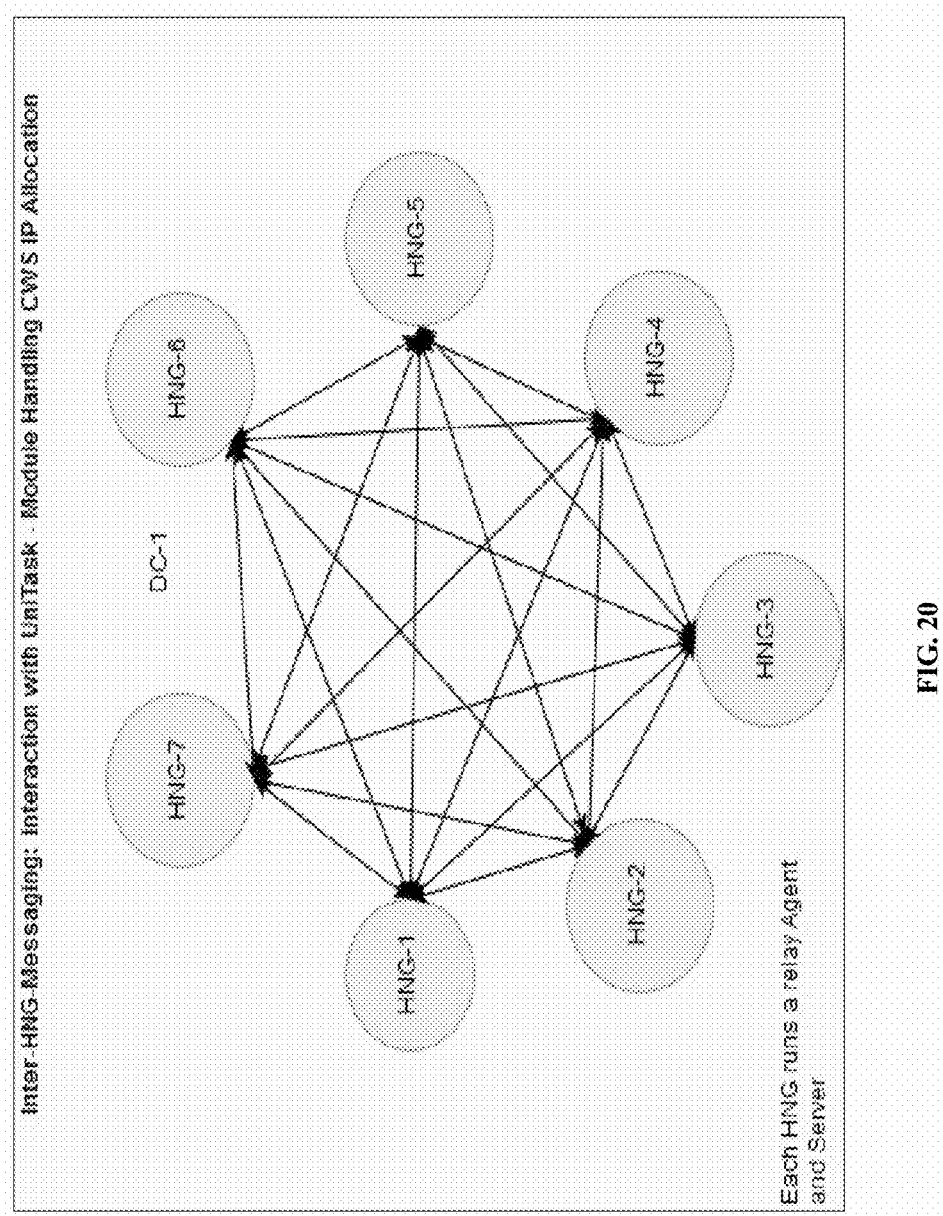
FIG. 20 is a system diagram for providing Internet Protocol (IP) address allocation in a wireless network showing inter-HNG messaging, in accordance with some embodiments.

FIG. 20 is a system diagram showing inter-HNG messaging: interaction with UniTask-module handling CWS IP Allocation.

Figure 21:
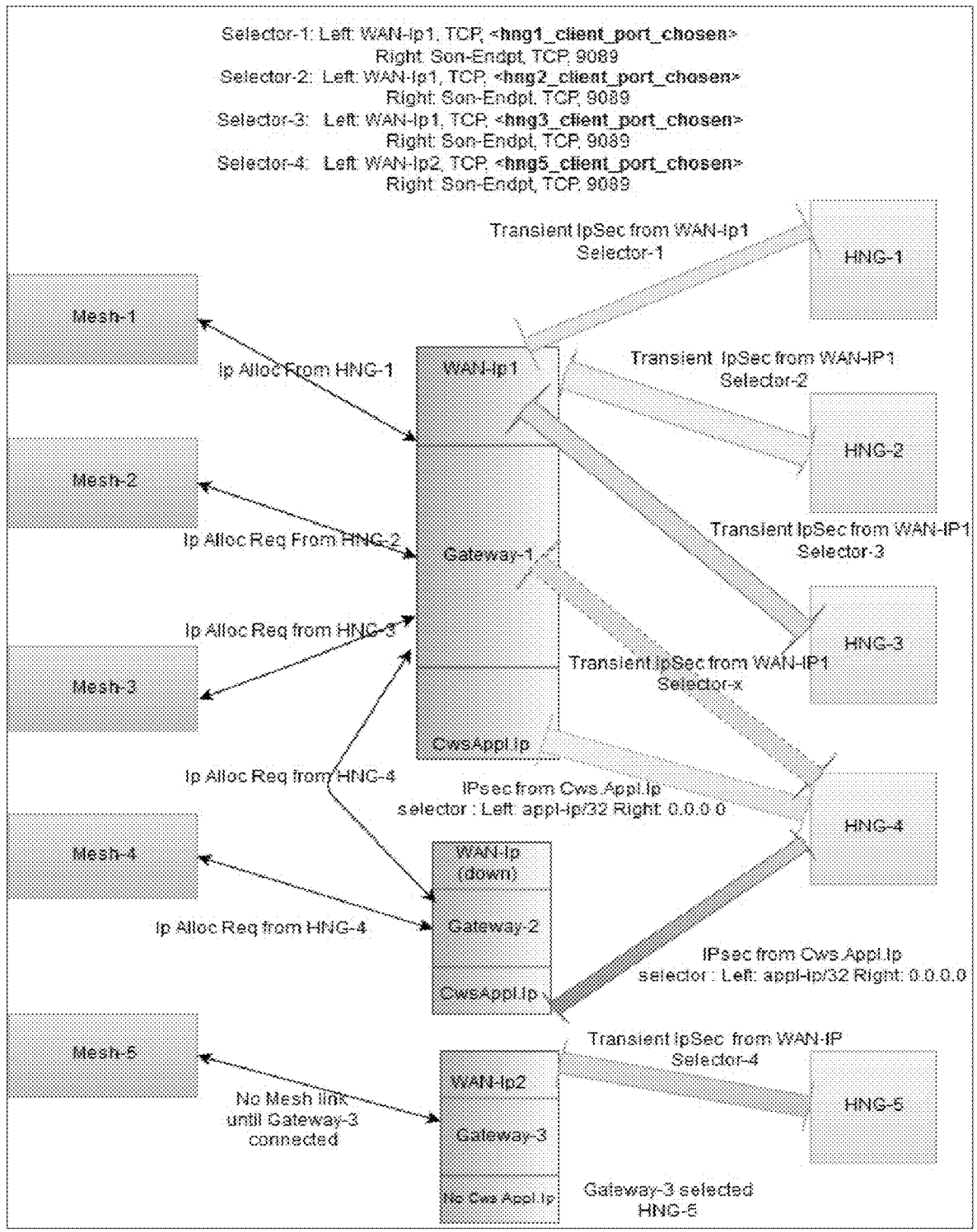
FIG. 21 is a system diagram for providing Internet Protocol (IP) address allocation in a wireless network showing any HNG deployment with transient IPsec for IP allocation, in accordance with some embodiments.

FIG. 21 is a system diagram showing any-HNG deployment with transient IPsec for IP allocation requests.

Single-HNG Deployment—(Create one transient tunnel at GW for IP Req for specific HNG if one does not exists). Simple and works for single-IP or multiple-IP. Ipsec tunnel can be from Gateway or Mesh and will relay Ip Alloc Req to HNG.

Multi-HNG With Centralized IP Pool DB (Service-Bus Persistence service). Same as Single-HNG Deployment. HNG IP Pool Mgmt is stateless.

Multi-HNG With Relay Mechanism at HNG (Service-Bus Messaging).—Same as Single-HNG Deployment.

Multi-HNG With Relay Mechanism at HNG (Generic TCP/IP Messaging).—Same as Single-HNG Deployment.

Any-HNG (Create Multiple transient tunnel at GW for IP Req for specific HNG if one does not exist).—Same as Single-HNG Deployment but creates new transient Ipsec tunnel based on what HNG selected if a tunnel does not exists already. No/Minimal HNG impact.

Figure 22:
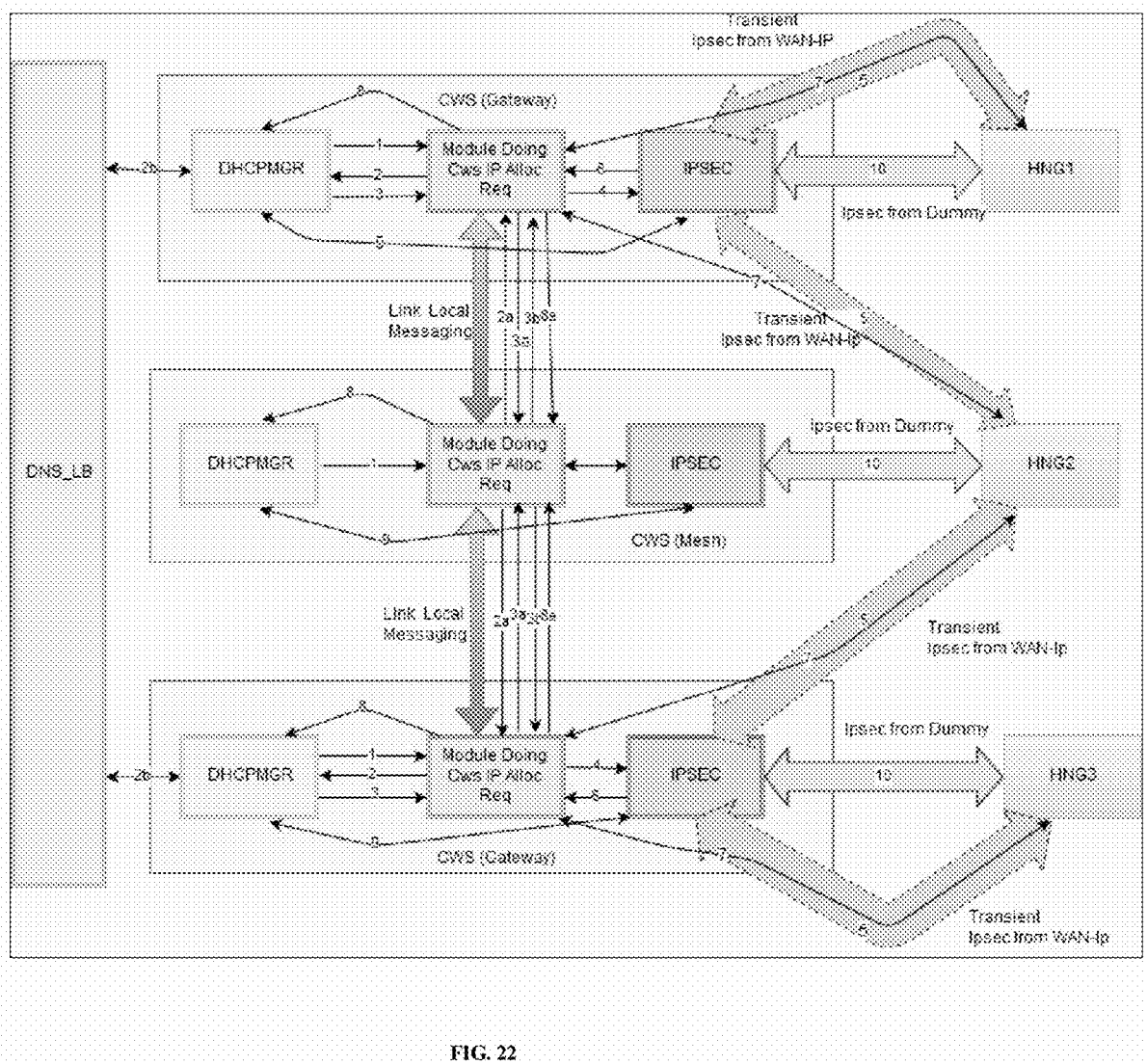
FIG. 22 is a system diagram for providing Internet Protocol (IP) address allocation in a wireless network showing any HNG deployment with transient IPsec for IP allocation, in accordance with some embodiments.

FIG. 22 shows CWS subsystem changes.

Figure 23:
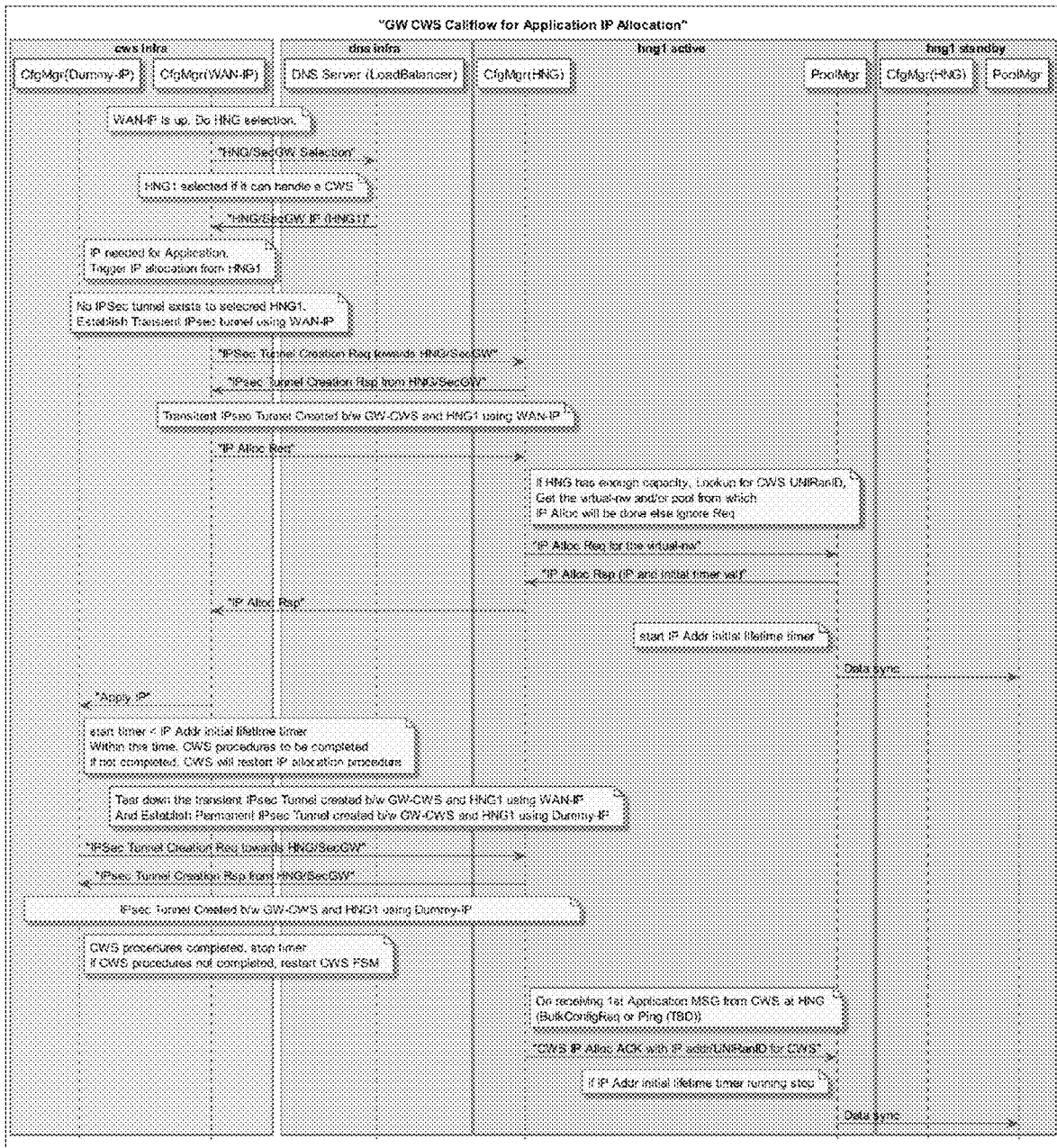
FIG. 23 is a call flow diagram for application IP allocation, in accordance with some embodiments.

FIG. 23 shows GW call flow for application IP allocation.

Figure 24:
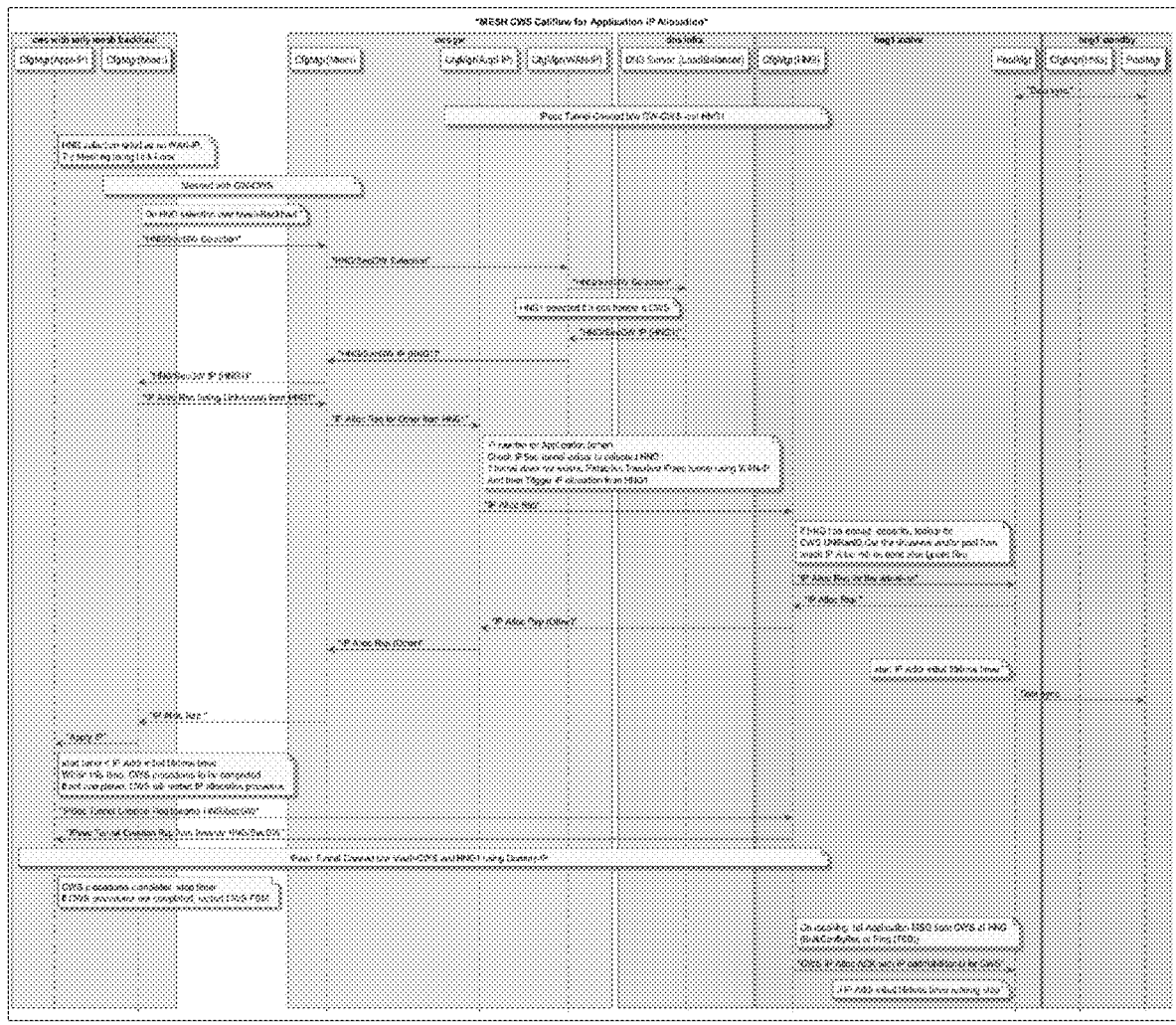
FIG. 24 is a mesh CWS call flow diagram for application IP allocation, in accordance with some embodiments.

FIG. 24 shows MESH CWS call flow for application IP allocation.

Figure 25:
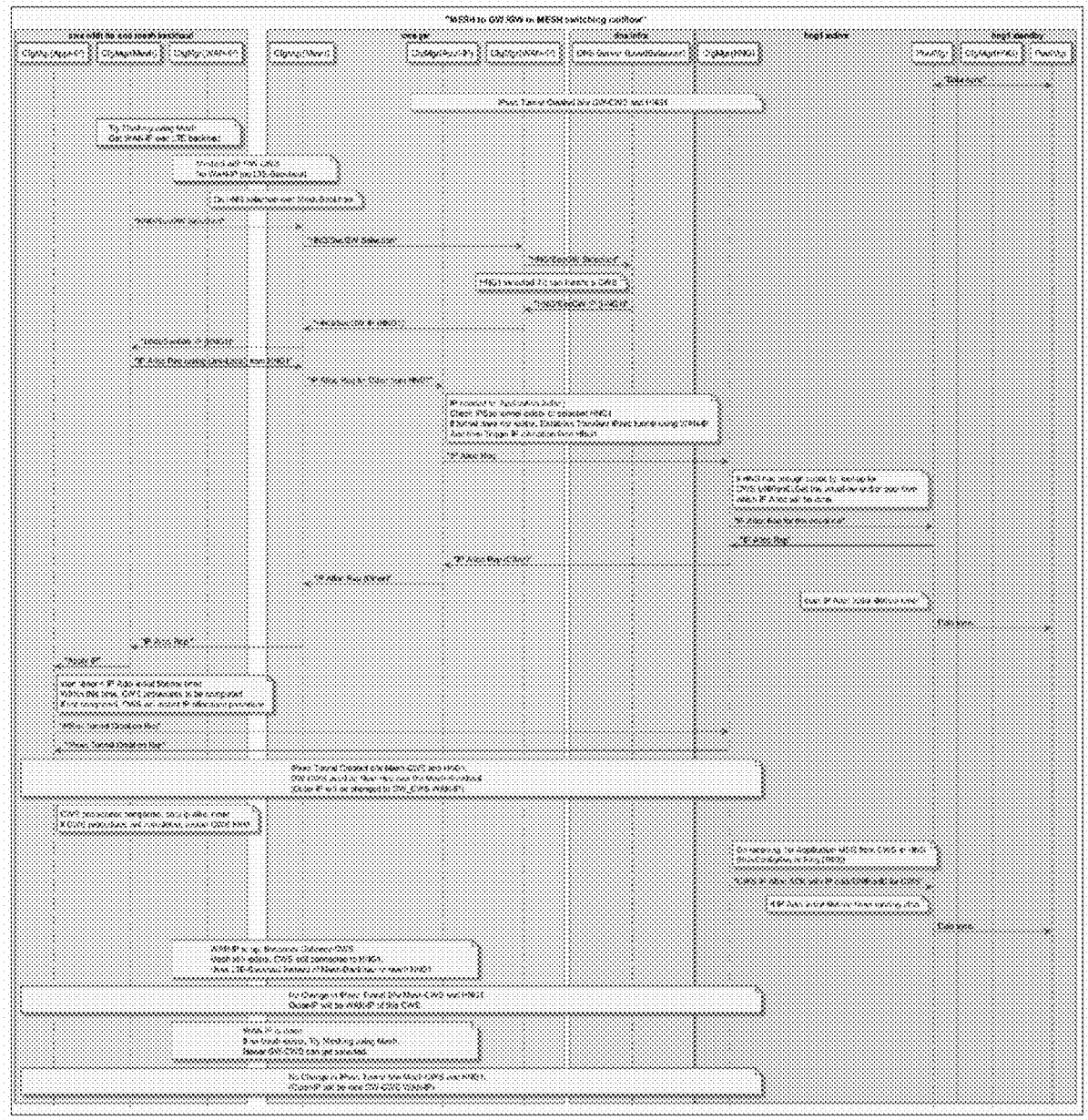
FIG. 25 is a mesh to GW/GW to mesh switching call flow diagram, in accordance with some embodiments.

FIG. 25 shows MESH to GW/GW to MESH switching call flow.

Figure 26:
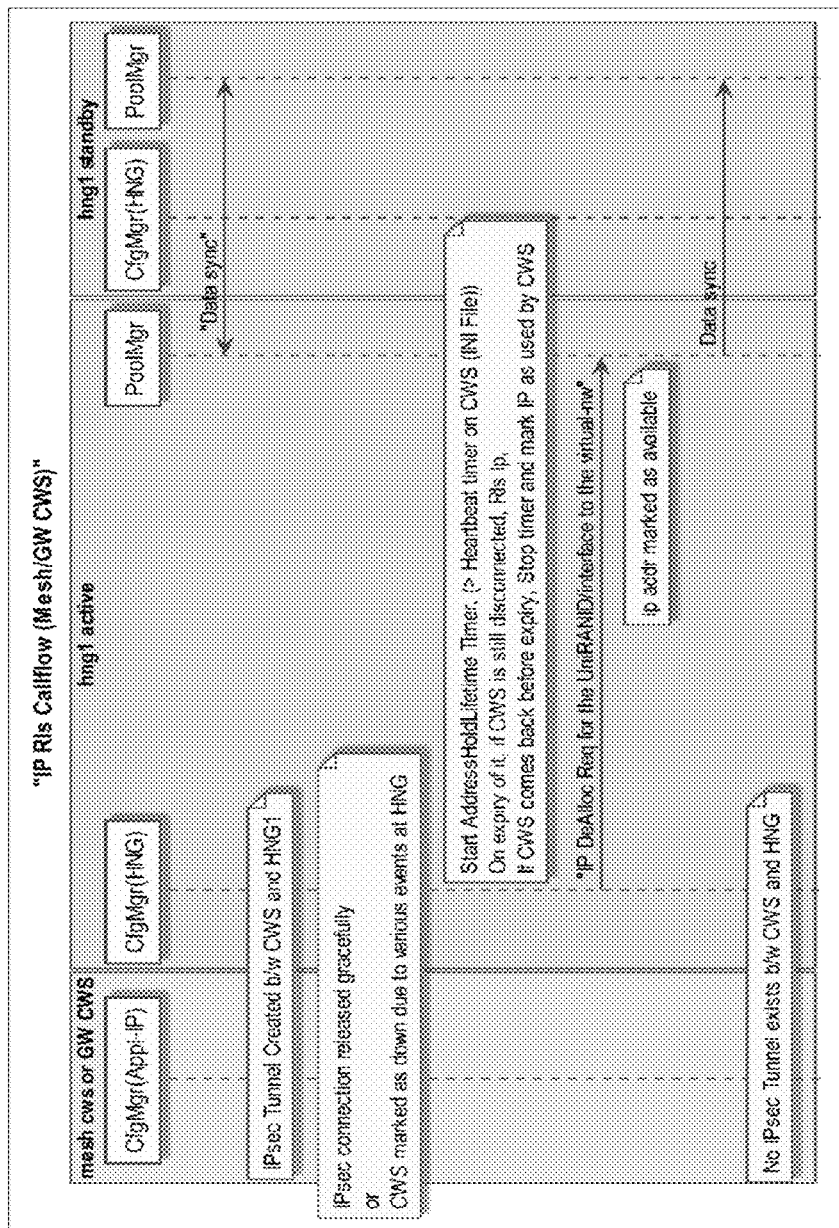
FIG. 26 is an IP Ms call flow diagram, in accordance with some embodiments.

FIG. 26 shows IP Ms call flow (MESH/GW CWS).

Figure 27:
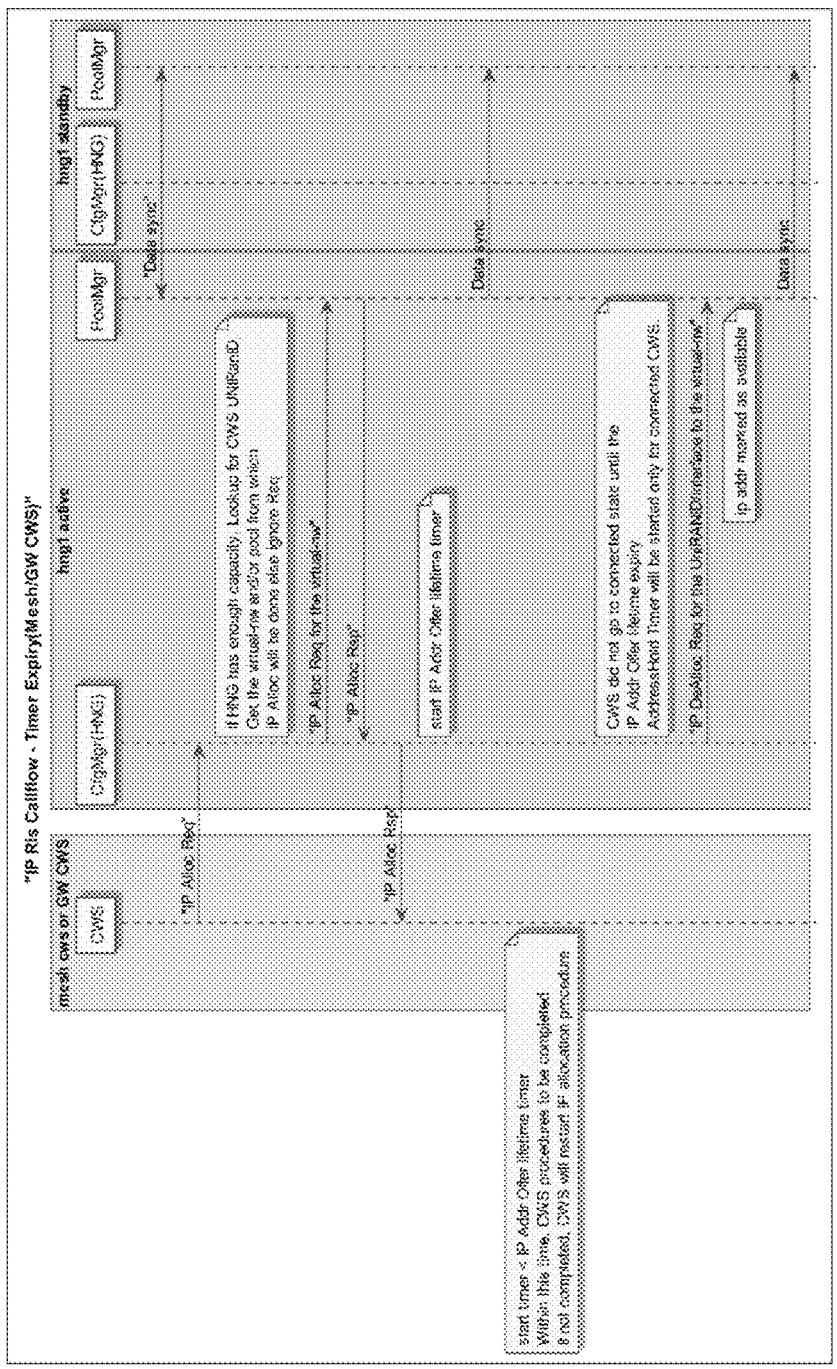
FIG. 27 is an IP Ms call flow-timer expiry diagram, in accordance with some embodiments.

FIG. 27 shows IP Ms call flow-Timer Expiry (MESH/GW CWS).

Figure 28:
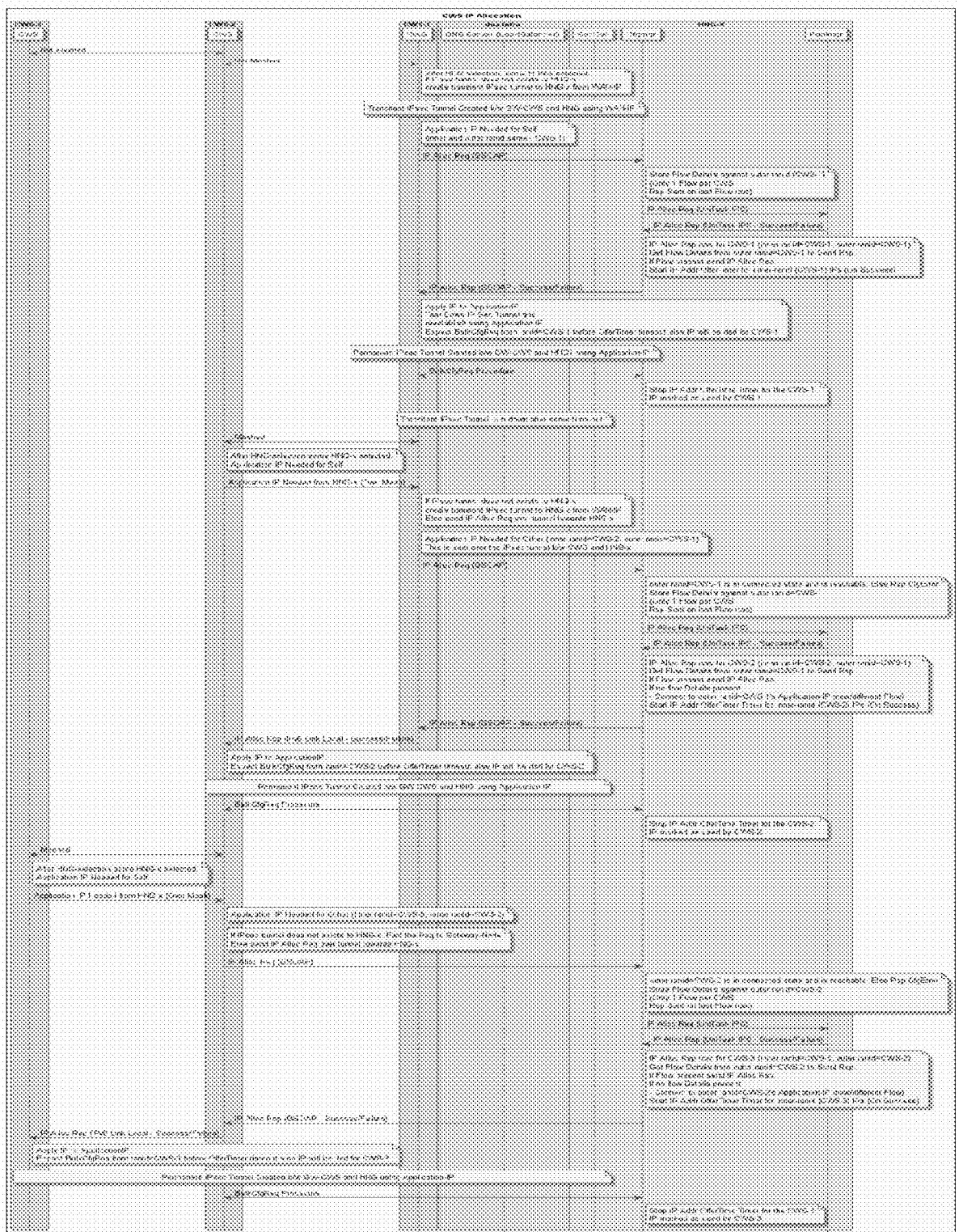
FIG. 28 is a CWS IP allocation call flow diagram, in accordance with some embodiments.

FIG. 28 shows CWS IP Allocation.

Figure 29:
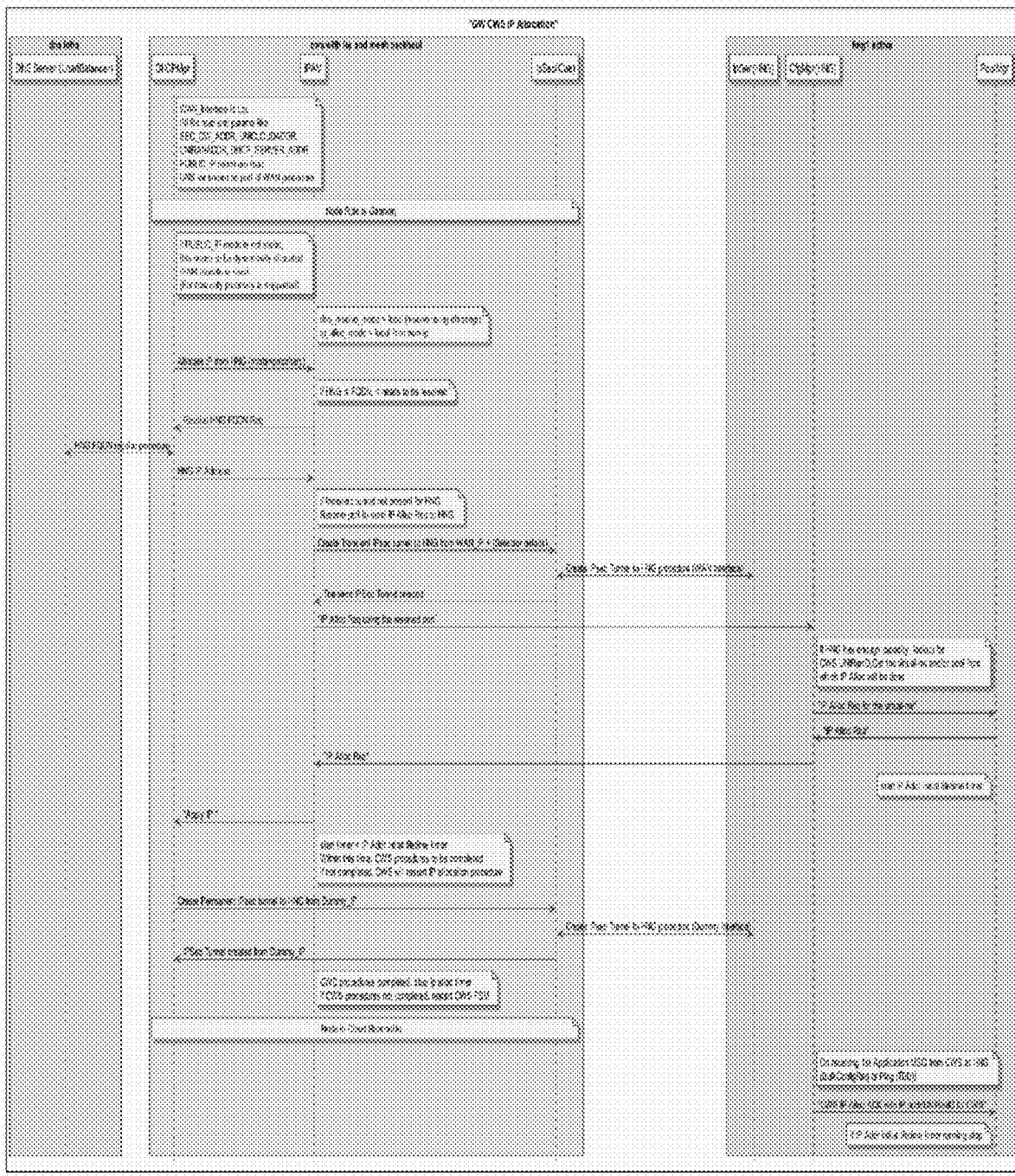
FIG. 29 is gateway CWS IP allocation call flow diagram, in accordance with some embodiments.

FIG. 29 shows GW CWS IP Allocation.

Figure 30:
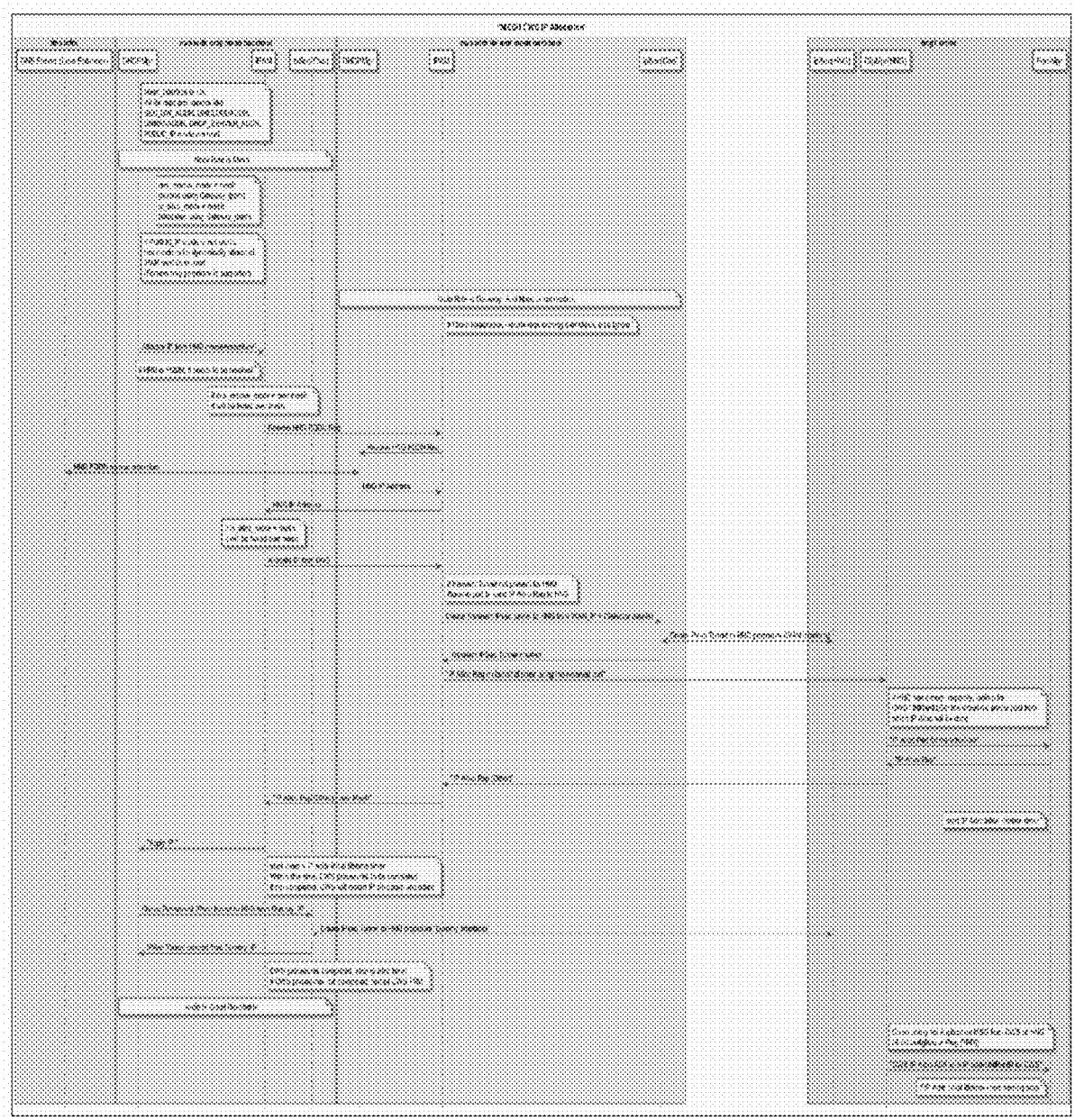
FIG. 30 is mesh CWS IP allocation call flow diagram, in accordance with some embodiments.

FIG. 30 shows MESH CWS IP Allocation.

Figure 31:
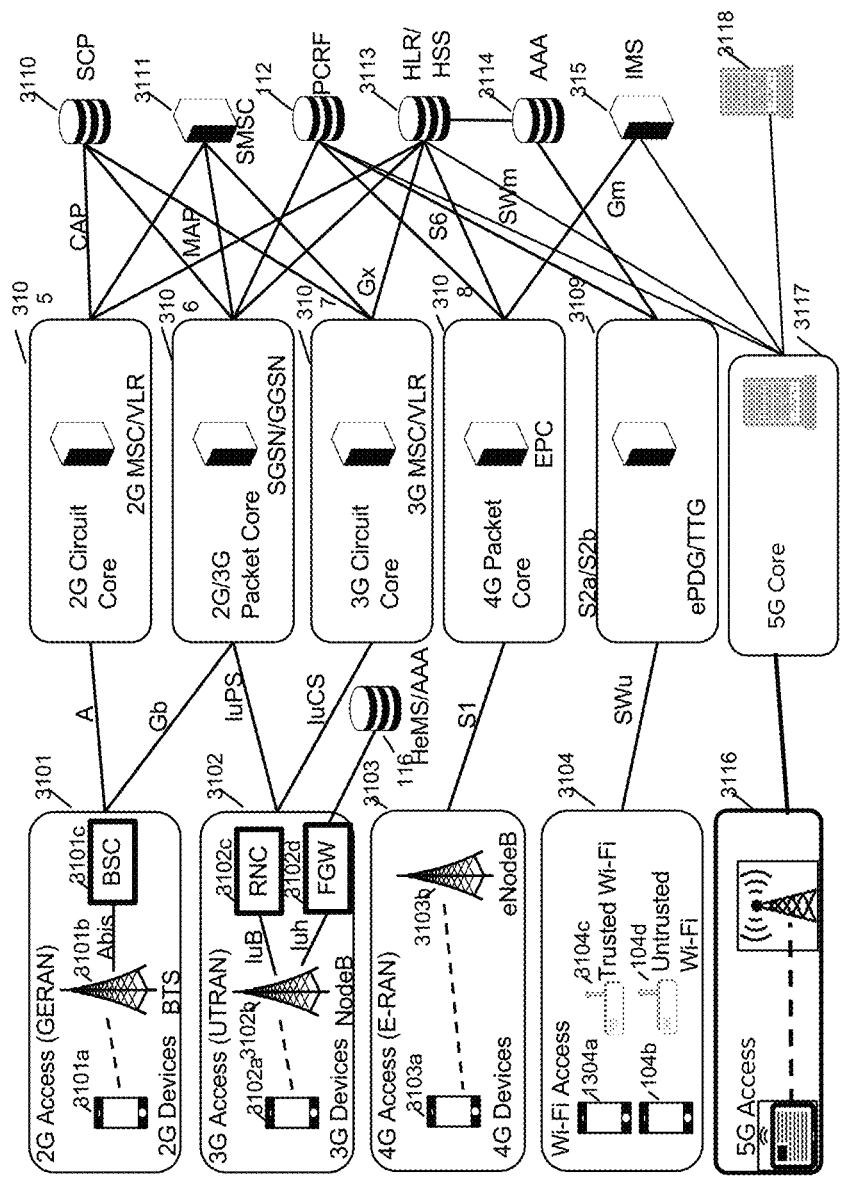
FIG. 31 is a schematic network architecture diagram for 3G and other-G networks.

FIG. 31 is a schematic network architecture diagram for 3G and other-G prior art networks. The diagram shows a plurality of "Gs," including 2G, 3G, 4G, 5G and Wi-Fi. 2G is represented by GERAN 3101, which includes a 2G device 3101a, BTS 3101b, and BSC 3101c. 3G is represented by UTRAN 3102, which includes a 3G UE 3102a, nodeB 3102b, RNC 3102c, and femto gateway (FGW, which in 3GPP namespace is also known as a Home nodeB Gateway or HNBGW) 3102d. 4G is represented by EUTRAN or E-RAN 3103, which includes an LTE UE 3103a and LTE eNodeB 3103b. Wi-Fi is represented by Wi-Fi access network 3104, which includes a trusted Wi-Fi access point 3104c and an untrusted Wi-Fi access point 3104d. The Wi-Fi devices 3104a and 3104b may access either AP 3104c or 3104d. In the current network architecture, each "G" has a core network. 2G circuit core network 3105 includes a 2G MSC/VLR; 2G/3G packet core network 3106 includes an SGSN/GGSN (for EDGE or UMTS packet traffic); 3G circuit core 3107 includes a 3G MSC/VLR; 4G circuit core 3108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 3130, the SMSC 3131, PCRF 3132, HLR/HSS 3133, Authentication, Authorization, and Accounting server (AAA) 3134, and IP Multimedia Subsystem (IMS) 3135. An HeMS/AAA 3136 is present in some cases for use by the 3G UTRAN. The diagram is used to indicate schematically the basic functions of each network as known to one of skill in the art, and is not intended to be exhaustive. For example, 5G core 3117 is shown using a single interface to 5G access 3116, although in some cases 5G access can be supported using dual connectivity or via a non-standalone deployment architecture.

Noteworthy is that the RANs 3101, 3102, 3103, 3104 and 3136 rely on specialized core networks 3105, 3106, 3107, 3108, 3109, 3137 but share essential management databases 3130, 3131, 3132, 3133, 3134, 3135, 3138. More specifically, for the 2G GERAN, a BSC 3101c is required for Abis compatibility with BTS 3101b, while for the 3G UTRAN, an RNC 3102c is required for Iub compatibility and an FGW 3102d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, RAU or TAU messages may no longer be needed because coordination is happening between the eNodeB and the nodeB. In some embodiments, the UE may receive messages from the core network (of any particular RAT that it is presently attached to) indicating that an ISR procedure has been performed, even though no TAU or RAU or other ISR message has been sent.

Wherever a core network node is described herein, the use of a virtualized network function may be contemplated instead of or in conjunction with a traditional core network node. For example, a virtual RNC or virtual MME may be used. For example, containerized network functions can be used that support a subset of the available resources and/or users at a particular time. Virtual network functions can be in containers, in virtual machines, private cloud, public cloud, on- or off-premises, etc. In some embodiments, virtual network functions may be networked together using private IP networks or other networks, and may use these networking communications channels for private communications according to or not according to 3GPP standard interfaces. In some embodiments, other communications channels may be used between network functions, up to and including shared access to memory.

In some embodiments, the word "colocated" can be used to describe the colocation of virtual network functions. For example, a plurality of base stations may be virtualized toward the core network by a coordinating server (HNG), which represents all of the plurality of base stations toward the core network as a single eNodeB. If a plurality of base stations of one RAT (e.g., 3G) and also a second plurality of base stations of another RAT (e.g., 4G) are both virtualized toward the core network using a single coordinating server, the coordinating server can be considered to co-locate the base station virtual functions of the two RATs. This is enabled by instantiating virtual network functions at the coordinating server for each RAT, and by using a stateful proxy at the coordinating server to provide consistent messaging toward both the core network and the UE to make both core network and UE interpret the communications of the plurality of base stations as coming from a single base station. This may be performed as further described herein and in the documents incorporated by reference herein. In such an instance, with the RAT virtualizing functions located at the same HNG, the RAT virtualizing functions can communicate with each other using a variety of interfaces and protocols, as described elsewhere herein and to provide the benefits described herein. In some embodiments, as the HNG is virtualizing the core network toward the UE, the HNG may report to the UE that the core network supports ISR when ISR is not supported by the core network (e.g., the MME/SGW/PGW of the LTE core); and the HNG may report to the UE that ISR procedures have been followed where in fact the ISR has been transparently facilitated by the HNG itself.

In some embodiments, a single HNG may be spread out over multiple servers, or even physical locations, and tied together using virtual memory and/or network connections, but this shall still be understood to be "co-located" for purposes of the present disclosure.

Wherever 3G and 4G radio access technologies (RATs) are discussed herein, it is understood that the present disclosure could be adapted to combinations of other RATs as well, for example, 3G and 5G, 4G and 5G, 4G and Wi-Fi, etc. For example, 5G introduces a new state, INACTIVE, as well as IDLE and CONNECTED, which are known in LTE, a new state, Rel-13 Suspend, that is used in LTE as well, and also two new messages, Suspend and Resume, that go along with these new states. When the UE is in the inactive or suspend states, it is able to move around within a limited area without updating the core network. In some embodiments, where a 4G and 5G core are colocated and the UE has moved from a 4G RAT to a 5G RAT (or vice versa), instead of signaling caused by the UE moving to CONNECTED state being performed between the 5G core and 4G core, the signaling can be absorbed between the core networks and the new serving node RAT can send a message to the UE indicating that all core network signaling is complete, without sending and receiving ISR messages between the cores.

The disclosed method does not require two nodes to be co-located, although that is the main use case. The disclosed method could be used with any two nodes as long as they are both managed at the same HNG (e.g., cloud coordination server or gateway). The HNG acts to provide ISR functionality even for core network nodes that do not support it, abstracting the core from the base station nodes. As well, a virtualized base station, virtual base station, containerized or virtual machine base station, etc. could also benefit from the disclosed method. As well, a variety of cores (MOCN, 2G/3G/4G/5G cores, etc.) could all be virtualized according to the disclosed method to present an ISR-compatible interface towards the base station.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing Internet Protocol (IP) address allocation in a wireless network, comprising:
   sending, by a mesh base station in the wireless network, an IP request to neighbor base stations;
   saving, by a gateway node (GW) in the wireless network, the request from the mesh base station;
   proxying, by the GW, the mesh request to a HetNet Gateway (HNG) by providing a transient IPSec tunnel;
   replying, by the HNG, to the GW with a response;
   forwarding, by the GW, the response to the mesh base station, the response including a dummy IP address; and
   starting, by the mesh base station, a Self Optimizing Network (SON) tunnel with the GW using the dummy IP address.

2. The method of claim 1 wherein the mesh base station has two GW neighbors further comprising:
   requesting the IP address for both GW neighbors; and
   using the IP address received first; and
   ignoring any other responses.

3. The method of claim 1 further comprising, after the sending the IP request to neighbor base stations, forwarding by mesh neighbor base stations having a dummy IP address, the request to other neighbor base stations.

4. The method of claim 1 wherein sending the IP request to neighbor base stations comprises sending a broadcast message on all interfaces of the mesh base station.

5. The method of claim 4 wherein sending a broadcast message on all interfaces of the mesh base station comprises sending a broadcast message including a Radio Access Network Identifier (RAN ID) and a Fully Qualified Domain Name (FQDN) of the HNG.

6. The method of claim 5 further comprising performing, by the GW, Domain Name System (DNS) resolution on the FQDN.

7. The method of claim 6 further comprising starting, by the GW, an IP-Sec tunnel with the HNG based on an address acquired by the Domain Name system (DNS) resolution on the FQDN.

8. The method of claim 7 further comprising tearing down, by the GW, the IPSec tunnel after receiving a response from the mesh node.

9. A system for providing Internet Protocol (IP) address allocation in a wireless network, comprising:
   a gateway (GW) node;
   a mesh base station in communication with the GW;
   a HetNet Gateway (HNG) in communication with the GW;
   wherein the mesh base station sends an IP request to neighbor base stations;
   the GW node saves the request from the mesh base station;
   the GW proxies the mesh request to the HNG by providing a transient IPSec tunnel;
   the HNG replies to the GW with a response;
   the GW forwards the response to the mesh base station, the response including a dummy IP address; and
   the mesh base station starts a Self Optimizing Network (SON) tunnel with the GW using the dummy IP address.

10. The system of claim 9 wherein, after the IP request is sent to neighbor base stations, mesh neighbor base stations having a dummy IP address forward the request to other neighbor base stations.

11. The system of claim 9 wherein the IP request sent to neighbor base stations is sent on all interfaces of the mesh base station.

12. The system of claim 11 wherein the broadcast message sent on all interfaces of the mesh base station comprises a broadcast message including a Radio Access Network Identifier (RAN ID) and a Fully Qualified Domain Name (FQDN) of the HNG.

13. The system of claim 12 wherein the GW performs Domain Name System (DNS) resolution on the FQDN.

14. The system of claim 13 wherein the GW starts an IPSec tunnel with the HNG based on an address acquired by the DNS resolution on the FQDN.

15. A non-transitory computer-readable medium containing instructions for providing Internet Protocol (IP) address allocation in a wireless network, comprising:
   sending, by a mesh base station in the wireless network, an IP request to neighbor base stations;
   saving, by a gateway node (GW) in the wireless network, the request from the mesh base station;
   proxying, by the GW, the mesh request to a HetNet Gateway (HNG) by providing a transient IPSec tunnel;
   replying, by the HNG, to the GW with a response;
   forwarding, by the GW, the response to the mesh base station, the response including a dummy IP address; and starting, by the mesh base station, a Self Optimizing Network (SON) tunnel with the GW using the dummy IP address.

16. The non-transitory computer-readable medium of claim 15 further including instructions for, after the sending the IP request to neighbor base stations, forwarding by mesh neighbor nodes having a dummy IP address, the request to other neighbor base stations.

17. The non-transitory computer-readable medium of claim 15 further including instructions wherein sending the IP request to neighbor base stations comprises sending a broadcast message on all interfaces of the mesh base station.

18. The non-transitory computer-readable medium of claim 17 further including instructions wherein sending a broadcast message on all interfaces of the mesh base station comprises sending a broadcast message including a Radio Access Network Identifier (RAN ID) and a Fully Qualified Domain Name (FQDN) of the HNG.

19. The non-transitory computer-readable medium claim 15 further including instructions for performing, by the GW, Domain Name System (DNS) resolution on the FQDN.

20. The non-transitory computer-readable medium of claim 19 further comprising instructions for starting, by the GW, an IPSec tunnel with the HNG based on an address acquired by the DNS resolution on the FQDN.

* * * * *